(12) United States Patent
Tanaka

(10) Patent No.: US 12,308,996 B2
(45) Date of Patent: May 20, 2025

(54) VEHICLE PLATFORM AND VEHICLE CONTROL INTERFACE BOX

(71) Applicant: TOYOTA JIDOSHA KABUSHIKI KAISHA, Toyota (JP)

(72) Inventor: Go Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 17/944,647

(22) Filed: Sep. 14, 2022

(65) Prior Publication Data
US 2023/0143376 A1 May 11, 2023

(30) Foreign Application Priority Data

Nov. 11, 2021 (JP) ................................. 2021-183957

(51) Int. Cl.
| | | |
|---|---|---|
| G06F 15/16 | (2006.01) | |
| B60W 60/00 | (2020.01) | |
| H04L 12/40 | (2006.01) | |
| H04L 47/11 | (2022.01) | |
| H04L 47/2475 | (2022.01) | |

(52) U.S. Cl.
CPC ..... H04L 12/40143 (2013.01); B60W 60/001 (2020.02); H04L 47/11 (2013.01); H04L 47/2475 (2013.01); H04L 2012/40215 (2013.01); H04L 2012/40273 (2013.01)

(58) Field of Classification Search
None
See application file for complete search history.

(56) References Cited

U.S. PATENT DOCUMENTS

| | | | |
|---|---|---|---|
| 11,678,301 B2 * | 6/2023 | Lee .................... | H04W 8/24 |
| | | | 370/329 |
| 2018/0126930 A1 | 5/2018 | Ando et al. | |
| 2020/0029245 A1 * | 1/2020 | Khoryaev ............. | H04W 36/22 |
| 2020/0229030 A1 * | 7/2020 | Nguyen ................ | H04W 24/08 |
| 2020/0229174 A1 * | 7/2020 | Nguyen ................ | H04W 72/51 |
| 2021/0016805 A1 * | 1/2021 | Oba ...................... | A61B 5/18 |
| 2021/0237765 A1 | 8/2021 | Ando | |

FOREIGN PATENT DOCUMENTS

| | | |
|---|---|---|
| JP | 2018-070121 A | 5/2018 |
| JP | 2018-132015 A | 8/2018 |
| JP | 2021-123135 A | 8/2021 |

* cited by examiner

*Primary Examiner* — Phuoc H Nguyen
(74) *Attorney, Agent, or Firm* — Oliff PLC

(57) ABSTRACT

A VP includes a base vehicle and a VCIB. The VCIB includes a reception unit, an index value calculation unit, a transmission unit, and a transmission plan setting unit. The reception unit receives a control request for the base vehicle from an ADS. The index value calculation unit calculates an index value showing a degree of congestion of CAN communication. The transmission unit transmits a control instruction for the base vehicle generated based on the control request to the base vehicle. The transmission plan setting unit sets a transmission plan of the control instruction to the base vehicle. The transmission plan setting unit sets the transmission plan according to a degree of priority of the control instruction in CAN communication and the index value.

11 Claims, 11 Drawing Sheets

FIG. 3

| | | | | | 208 |
|---|---|---|---|---|---|
| [INFORMATION ON SIGNALS TRANSMITTED FROM ADK TO VCIB] 212 ||||||
| LABEL | SIGNAL CONTENTS | DEGREE OF PRIORITY | TRANSMISSION CYCLE | DATA SIZE | OFFSET |
| A1-1 | DRIVE CONTROL | HIGH | Ta1-1 | Sa1-1 | Oa1-1 |
| A2-2 | WIPER CONTROL | LOW | Ta2-1 | Sa2-1 | Oa2-1 |
| ⋮ | ⋮ | ⋮ | ⋮ | ⋮ | ⋮ |

FIG. 4

[DATA ON PLAN OF RECEPTION FROM ADS] DRC1  432

| LABEL | SIGNAL CONTENTS | DEGREE OF PRIORITY | DESIGNED RECEPTION CYCLE | DATA SIZE |
|---|---|---|---|---|
| A1-1 | DRIVE CONTROL | HIGH | Ta1-10 | Sa1-1 |
| A2-1 | WIPER CONTROL | LOW | Ta2-10 | Sa2-1 |
| ⋮ | ⋮ | ⋮ | ⋮ | ⋮ |

[DATA ON PLAN OF TRANSMISSION TO BASE VEHICLE] OI1  433

| LABEL | SIGNAL CONTENTS | DEGREE OF PRIORITY | TRANSMISSION CYCLE | DATA SIZE | OFFSET |
|---|---|---|---|---|---|
| B1-1 | DRIVE CONTROL | HIGH | Tb1-1 | Sb1-1 | Ob1-1 |
| B2-1 | WIPER CONTROL | LOW | Tb2-1 | Sb2-1 | Ob2-1 |
| ⋮ | ⋮ | ⋮ | ⋮ | ⋮ | ⋮ |

[DATA ON PLAN OF RECEPTION FROM BASE VEHICLE]  434
DRC2

| LABEL | SIGNAL CONTENTS | DESIGNED RECEPTION CYCLE | DATA SIZE |
|---|---|---|---|
| C1-1 | VEHICLE MOVING DIRECTION | Tc1-1 | Sc1-1 |
| ⋮ | ⋮ | ⋮ | ⋮ |

[DATA ON PLAN OF TRANSMISSION TO ADS] OI2  435

| LABEL | SIGNAL CONTENTS | TRANSMISSION CYCLE | DATA SIZE | OFFSET |
|---|---|---|---|---|
| D1-1 | VEHICLE MOVING DIRECTION | Td1-1 | Sd1-1 | Od1-1 |
| ⋮ | ⋮ | ⋮ | ⋮ | ⋮ |

111(430)

VEHICLE PLATFORM AND VEHICLE CONTROL INTERFACE BOX

CROSS-REFERENCE TO RELATED APPLICATION

This application claims priority to Japanese Patent Application No. 2021-183957 filed on Nov. 11, 2021, incorporated herein by reference in its entirety.

BACKGROUND

1. Technical Field

This disclosure relates to a vehicle platform configured such that an autonomous driving system is installable in the vehicle platform, and a vehicle control interface box that acts as an interface between a vehicle platform and an autonomous driving system installed in the vehicle platform.

2. Description of Related Art

Japanese Unexamined Patent Application Publication No. 2018-132015 (JP 2018-132015 A) discloses a vehicle equipped with an autonomous driving system. This vehicle is equipped with a motive power system, a power source system, and the autonomous driving system. The motive power system integrally manages motive power in the vehicle. The power source system integrally manages, for example, charging and discharging electricity of a battery mounted in the vehicle and electricity supply to various on-board devices. The autonomous driving system integrally executes autonomous driving control of the vehicle. An engine electronic control unit (ECU) of the motive power system, a power source ECU of the power source system, and an autonomous driving ECU of the autonomous driving system are communicably connected to one another through an on-board network (see JP 2018-132015 A).

SUMMARY

It is conceivable to retrofit a vehicle with an autonomous driving system developed by an autonomous driving system company. In this case, autonomous driving is realized as vehicle control is executed according to control requests from the added autonomous driving system to the vehicle.

In such a vehicle, an interface for various instructions and signals exchanged between the added autonomous driving system and the vehicle is important. Controller area network (CAN) communication is sometimes used for such an interface.

When CAN communication becomes congested, the various instructions and signals may fail to be appropriately transmitted to the vehicle through the interface. As a result, autonomous driving of the vehicle may not be appropriately executed according to control requests from the autonomous driving system.

This disclosure has been made to solve this problem, and an object thereof is to make it possible, in a vehicle platform equipped with an autonomous driving system, to appropriately execute autonomous driving according to control requests from the autonomous driving system when CAN communication between a vehicle and the autonomous driving system becomes congested.

Another object of this disclosure is to make it possible, in a vehicle control interface box that acts as an interface between a vehicle platform and an autonomous driving system installed in the vehicle platform, to appropriately execute autonomous driving according to control requests from the autonomous driving system when CAN communication between a vehicle and the autonomous driving system becomes congested.

A vehicle platform of this disclosure is configured such that an autonomous driving system is installable in the vehicle platform. The vehicle platform includes a vehicle and a vehicle control interface box. The vehicle control interface box acts as an interface between the vehicle and the autonomous driving system installed in the vehicle by CAN communication. The vehicle control interface box includes a first reception unit, a calculation unit, a transmission unit, and a setting unit. The first reception unit receives a control request for the vehicle from the autonomous driving system. The calculation unit calculates an index value showing a degree of congestion of the CAN communication. The transmission unit transmits a control instruction for the vehicle generated based on the control request to the vehicle. The setting unit sets a transmission plan of the control instruction to the vehicle. The setting unit sets the transmission plan according to a degree of priority of the control instruction in the CAN communication and the index value.

By this configuration, in addition to the degree of priority of the control instruction, the degree of congestion of CAN communication is reflected on the transmission plan of the control instruction. Thus, when CAN communication is congested, the control instruction can be transmitted from the vehicle control interface box to the vehicle so as to reduce the degree of congestion of CAN communication. As a result, the control instruction is appropriately transmitted from the vehicle control interface box to the vehicle. Therefore, autonomous driving of the vehicle can be appropriately executed according to control requests from the autonomous driving system.

The control instruction may be classified into one of a plurality of groups according to the degree of priority. The plurality of groups may include a first group of which the degree of priority is high and a second group of which the degree of priority is lower than that of the first group. The setting unit may set the transmission plan such that a transmission cycle of a control instruction classified into the second group becomes longer when the index value is large than when the index value is small.

By this configuration, the transmission frequency of control requests classified into the second group becomes lower when CAN communication is congested than when CAN communication is not congested. Thus, it is possible to reduce the degree of congestion of CAN communication while continuing to transmit control requests classified into the first group with a high degree of priority as before CAN communication becomes congested.

The control instruction may be classified into one of a plurality of groups according to the degree of priority. The plurality of groups may include a first group of which the degree of priority is high and a second group of which the degree of priority is lower than that of the first group. The setting unit may set a transmission waiting time of the control instruction classified into the second group such that a transmission period of the control instruction classified into the second group does not overlap with a transmission period of the control instruction classified into the first group.

This configuration makes it possible to reduce the degree of congestion of CAN communication while continuing to transmit control requests classified into the first group with a high degree of priority as before CAN communication becomes congested.

The setting unit may set the transmission plan such that the transmission waiting time becomes longer when the index value is large than when the index value is small.

By this configuration, the transmission frequency of control requests classified into the second group becomes lower when CAN communication is congested than when CAN communication is not congested. Thus, it is possible to further reduce the degree of congestion of CAN communication while continuing to transmit control requests classified into the first group with a high degree of priority as before CAN communication becomes congested.

The index value may include a first communication delay time and a second communication delay time. The first communication delay time is a delay time in communication from the autonomous driving system to the vehicle through the vehicle control interface box. The second communication delay time is a delay time in communication from the vehicle to the autonomous driving system through the vehicle control interface box.

By this configuration, the delay time in communication between the autonomous driving system and the vehicle is reflected on the index value. As a result, the index value can be appropriately calculated.

Communication lines in which the CAN communication is performed may include a first communication line that connects the autonomous driving system and the vehicle control interface box to each other. The first communication delay time may include a reception delay time and a processing delay time. The reception delay time occurs when the first reception unit receives the control request through the first communication line. The processing delay time occurs in processing during a period from when the first reception unit receives the control request until when the transmission unit transmits the control instruction.

By this configuration, the reception delay time and the processing delay time of a control request in the CAN communication from the autonomous driving system to the vehicle through the vehicle control interface box are reflected on the index value. As a result, the index value can be more appropriately calculated.

Communication lines in which the CAN communication is performed may include a second communication line that connects the vehicle control interface box and the vehicle to each other. The vehicle control interface box may further include a second reception unit that receives a vehicle state signal showing a state of the vehicle from the vehicle. When the second reception unit receives the vehicle state signal, the transmission unit may transmit a signal generated based on the vehicle state signal to the autonomous driving system. The second communication delay time may include a reception delay time and a processing delay time. The reception delay time occurs when the second reception unit receives the vehicle state signal through the second communication line. The processing delay time occurs in processing during a period from when the second reception unit receives the vehicle state signal until when the transmission unit transmits a signal generated based on the vehicle state signal.

By this configuration, the reception delay time and the processing delay time of a vehicle state signal in the CAN communication from the vehicle to the autonomous driving system through the vehicle control interface box are reflected on the index value. As a result, the index value can be more appropriately calculated.

A vehicle control interface box of this disclosure acts as an interface between a vehicle platform and an autonomous driving system installed in the vehicle platform by CAN communication. The vehicle platform includes a vehicle. The vehicle control interface box includes a first reception unit, a calculation unit, a transmission unit, and a setting unit. The first reception unit receives a control request for the vehicle from the autonomous driving system. The calculation unit calculates an index value showing a degree of congestion of the CAN communication. The transmission unit transmits a control instruction for the vehicle generated based on the control request to the vehicle. The setting unit sets a transmission plan of the control instruction to the vehicle. The setting unit sets the transmission plan according to a degree of priority of the control instruction in the CAN communication and the index value.

The control instruction may be classified into one of a plurality of groups according to the degree of priority. The plurality of groups may include a first group of which the degree of priority is high and a second group of which the degree of priority is lower than that of the first group. The setting unit may set the transmission plan such that a transmission cycle of a control instruction classified into the second group becomes longer when the index value is large than when the index value is small.

The control instruction may be classified into one of a plurality of groups according to the degree of priority. The plurality of groups may include a first group of which the degree of priority is high and a second group of which the degree of priority is lower than that of the first group. The setting unit may set a transmission waiting time of the control instruction classified into the second group such that a transmission period of the control instruction classified into the second group does not overlap with a transmission period of the control instruction classified into the first group.

The setting unit may set the transmission plan such that the transmission waiting time becomes longer when the index value is large than when the index value is small.

The index value may include a first communication delay time and a second communication delay time. The first communication delay time is a delay time in communication from the autonomous driving system to the vehicle through the vehicle control interface box. The second communication delay time is a delay time in communication from the vehicle to the autonomous driving system through the vehicle control interface box.

Communication lines in which the CAN communication is performed may include a first communication line that connects the autonomous driving system and the vehicle control interface box to each other. The first communication delay time may include a reception delay time and a processing delay time. The reception delay time occurs when the first reception unit receives the control request through the first communication line. The processing delay time occurs in processing during a period from when the first reception unit receives the control request until when the transmission unit transmits the control instruction.

Communication lines in which the CAN communication is performed may include a second communication line that connects the vehicle control interface box and the vehicle to each other. The vehicle control interface box may further include a second reception unit that receives a vehicle state signal showing a state of the vehicle from the vehicle through the second communication line. When the second reception unit receives the vehicle state signal, the transmission unit may transmit a signal generated based on the vehicle state signal to the autonomous driving system. The second communication delay time may include a reception delay time and a processing delay time. The reception delay time occurs when the second reception unit receives the vehicle state signal. The processing delay time occurs in processing during a period from when the second reception unit receives the vehicle state signal until when the transmission unit transmits a signal generated based on the vehicle state signal.

The first reception unit may be configured to receive a plurality of control requests. The calculation unit may calculate a total of the reception delay time and the processing delay time for each of the control requests, and calculate, as the index value, a first average value that is an average value of the totals calculated for the respective control requests.

The second reception unit may be configured to receive a plurality of vehicle state signals. The calculation unit may calculate a total of the reception delay time and the processing delay time for each of the vehicle state signals, and calculate, as the index value, a second average value that is an average value of the totals calculated for the respective vehicle state signals.

According to this disclosure, autonomous driving can be appropriately executed according to control requests from the autonomous driving system to the vehicle when the CAN communication between the vehicle and the autonomous driving system becomes congested.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a table showing data representing a plan of transmission of CAN signals (control requests) transmitted from the ADS to a VCIB through a CAN communication line;

FIG. 4 is tables showing plans of reception of CAN signals received by the VCIB and plans of transmission of CAN signals transmitted by the VCIB;

DETAILED DESCRIPTION OF EMBODIMENTS

Embodiment

Figure 1:
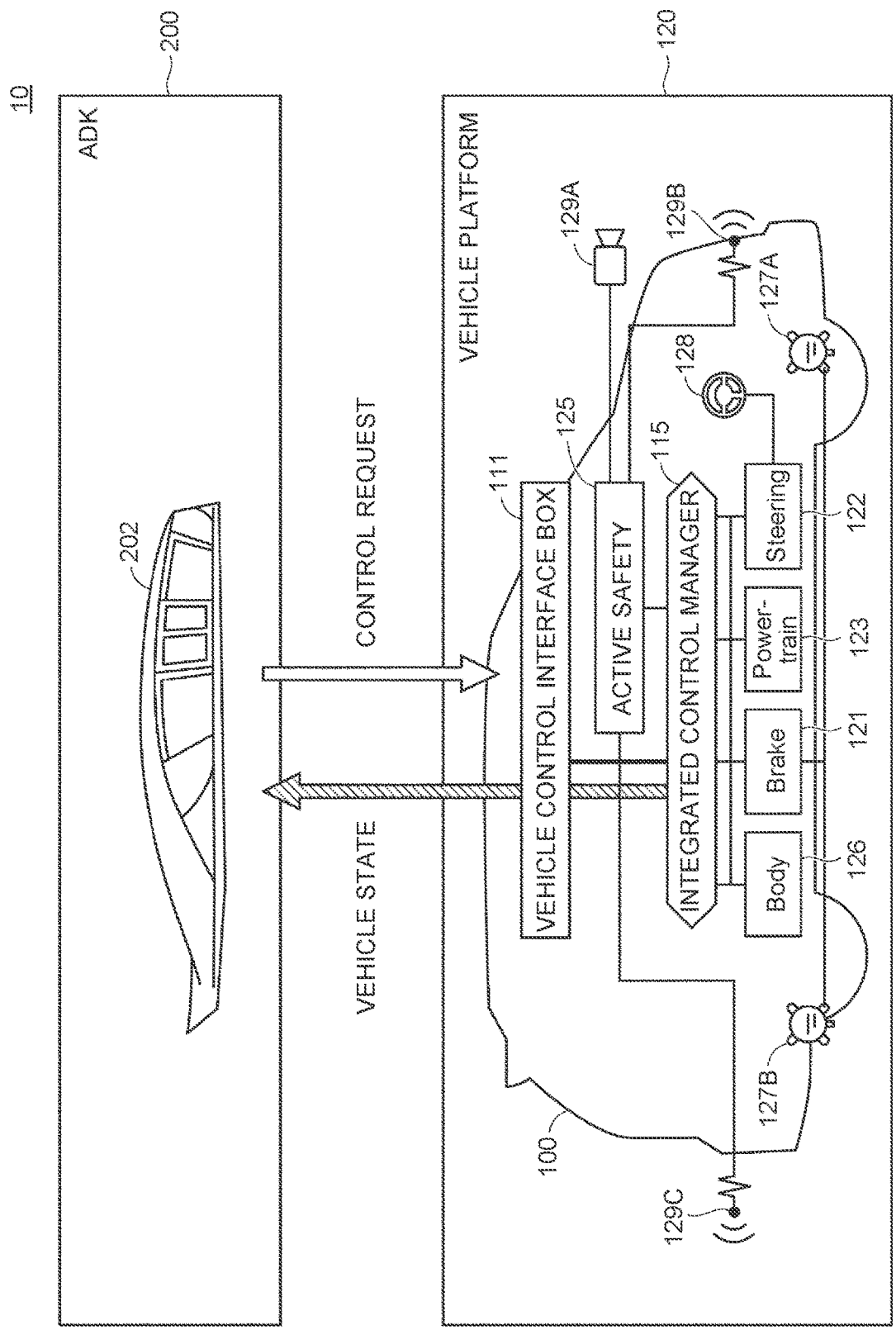
FIG. 1 is a diagram showing an overview of a vehicle according to an embodiment.

An embodiment will be described in detail below with reference to the drawings. The same or equivalent parts in the drawings will be denoted by the same reference signs and the description thereof will not be repeated.

FIG. 1 is a diagram showing an overview of a vehicle 10 according to the embodiment. Referring to FIG. 1, the vehicle 10 includes an autonomous driving kit (hereinafter referred to as an "ADK") 200 and a vehicle platform (hereinafter referred to as a "VP") 120. The ADK 200 is configured to be mountable to (installable in) the VP 120. The ADK 200 and the VP 120 are configured to be able to communicate with each other through a vehicle control interface box 111 (to be described later) installed in the VP 120.

The VP 120 can perform autonomous driving according to a control request from the ADK 200. In FIG. 1, the VP 120 and the ADK 200 are shown at positions away from each other, but in reality the ADK 200 is mounted to a rooftop etc. of a base vehicle 100 (to be described later) constituting a part of the VP 120. The ADK 200 can also be removed from the VP 120. When the ADK 200 has been removed, the VP 120 can travel by driving of a user. In this case, the VP 120 executes travel control in manual mode (travel control according to the user's operation).

The ADK 200 includes an autonomous driving system (hereinafter referred to as an "ADS") 202 for performing autonomous driving of the vehicle 10. For example, the ADS 202 creates a travel plan of the vehicle 10. The ADS 202 outputs various control requests for causing the vehicle 10 to travel in accordance with the created travel plan to the VP 120 according to an application program interface (API) defined for each request. Further, the ADS 202 receives various signals showing a state of the VP 120 (vehicle state) from the VP 120 according to an API defined for each signal. Then, the ADS 202 reflects the received vehicle state in creating the travel plan. The detailed configuration of the ADS 202 will be described later.

The VP 120 incudes the base vehicle 100 and the vehicle control interface box (hereinafter referred to as a "VCIB") 111.

The base vehicle 100 executes various types of vehicle control according to control requests from the ADK 200 (ADS 202). The base vehicle 100 includes various systems and various sensors for controlling the vehicle. Specifically, the base vehicle 100 includes an integrated control manager 115, a brake system 121, a steering system 122, a powertrain system 123, an active safety system 125, a body system 126, wheel speed sensors 127A, 127B, a pinion angle sensor 128, a camera 129A, and radar sensors 129B, 129C.

The integrated control manager 115 includes a processor and a memory, and integrally controls the aforementioned systems involved in the operation of the vehicle (the brake system 121, the steering system 122, the powertrain system 123, the active safety system 125, and the body system 126). Each system includes an ECU.

The brake system 121 is configured to control a braking device provided in each wheel. The braking device includes, for example, a disk brake system (not shown) that operates using an oil pressure adjusted by an actuator.

The wheel speed sensors 127A, 127B are connected to the brake system 121. The wheel speed sensor 127A detects a rotation speed of a front wheel and outputs the detected value to the brake system 121. The wheel speed sensor 127B detects a rotation speed of a rear wheel and outputs the detected value to the brake system 121.

The brake system 121 generates a braking instruction for the braking device according to a predetermined control request (control instruction) that is output from the ADK 200 through the VCIB 111 and the integrated control manager 115. Then, the brake system 121 controls the braking device using the generated braking instruction. The integrated control manager 115 can calculate the speed of the vehicle (vehicle speed) based on the rotation speed of each wheel.

The steering system 122 is configured to control the steering angle of a steering wheel of the vehicle using a steering device. For example, the steering device includes a rack-and-pinion electric power steering (EPS) that can adjust the steering angle by an actuator.

The pinion angle sensor 128 is connected to the steering system 122. The pinion angle sensor 128 detects a rotation angle (pinion angle) of a pinion gear coupled to a rotating shaft of an actuator that constitutes a part of the steering device, and outputs the detected value to the steering system 122.

The steering system 122 generates a steering instruction for the steering device according to a predetermined control request output from the ADK 200 through the VCIB 111 and the integrated control manager 115. The steering system 122 controls the steering device using the generated steering instruction.

The powertrain system 123 controls an electric parking brake (EPB) system provided in at least one of the wheels, a parking lock (P-Lock) system provided in a transmission of the base vehicle 100, and a propulsion system including a shift device for selecting a shift range. The detailed configuration of the powertrain system 123 will be described later using FIG. 2.

The active safety system 125 detects obstacles (pedestrians, bicycles, parked vehicles, utility poles, etc.) on a front side and a rear side of the vehicle using the camera 129A and the radar sensors 129B, 129C. The active safety system 125 determines whether there is a possibility that the vehicle 10 may collide with an obstacle based on a distance between the vehicle 10 and the obstacle and a moving direction of the vehicle 10. When it is determined that there is a possibility of a collision, the active safety system 125 outputs a braking instruction to the brake system 121 through the integrated control manager 115 so as to increase the braking force of the vehicle.

The body system 126 is configured to control parts including a direction indicator, a horn, and a wiper (none of which is shown) according to, for example, the travel state of the vehicle 10, the environment, etc. The body system 126 controls these parts according to a predetermined control request output from the ADK 200 through the VCIB 111 and the integrated control manager 115.

The VCIB 111 is configured to be able to communicate with the ADS 202 of the ADK 200 through a CAN communication line. The VCIB 111 receives various control requests from the ADS 202 and outputs the state of the VP 120 to the ADS 202 by executing a predetermined API defined for each signal to be communicated. Upon receiving a control request from the ADS 202, the VCIB 111 outputs a control instruction corresponding to the control request to a system corresponding to the control instruction through the integrated control manager 115. Further, the VCIB 111 acquires various pieces of information on the base vehicle 100 from various systems through the integrated control manager 115 and outputs the state of the base vehicle 100 as the vehicle state to the ADS 202.

The vehicle 10 can be used as one of components of a Mobility-as-a-Service (MaaS) system. The MaaS system includes, in addition to the vehicle 10, for example, a data server and a mobility service platform (MSPF) (neither of which is shown).

The MSPF is an integrated platform to which various mobility services are connected. Autonomous driving-related mobility services are connected to the MSPF. Other than autonomous driving-related mobility services, mobility services provided by a ride-sharing company, a car-sharing company, a car rental company, a taxi company, an insurance company, and the like can be connected to the MSPF. Various mobility services including autonomous driving-related mobility services can use a wide variety of functions provided by the MSPF according to the contents of the service by means of APIs that are publicly available in the MSPF.

The VP 120 further includes a data communication module (DCM) (not shown) as a communication interface (I/F) for wirelessly communicating with the data server of the MaaS System. For example, the DCM outputs various pieces of vehicle information, such as the speed, the position, and the autonomous driving state, to the data server. Further, for example, the DCM receives various pieces of data for managing the travel of the autonomous driving vehicles, including the vehicle 10, in an autonomous driving-related mobility service from the mobility service through the MSPF and the data server.

In the MSPF, APIs for using various pieces of data on the vehicle state and vehicle control required to develop an ADK are publicly available. Using the APIs publicly available in the MSPF, various mobility services can use a wide variety of functions provided by the MSPF according to the contents of the service. For example, using an API publicly available in the MSPF, an autonomous driving-related mobility service can acquire driving control data on an autonomous driving vehicle that communicates with the data server, information stored in the data server, etc. from the MSPF. Further, using the API, the autonomous driving-related mobility service can transmit data etc. for managing the autonomous driving vehicles including the vehicle 10 to the MSPF.

Figure 2:
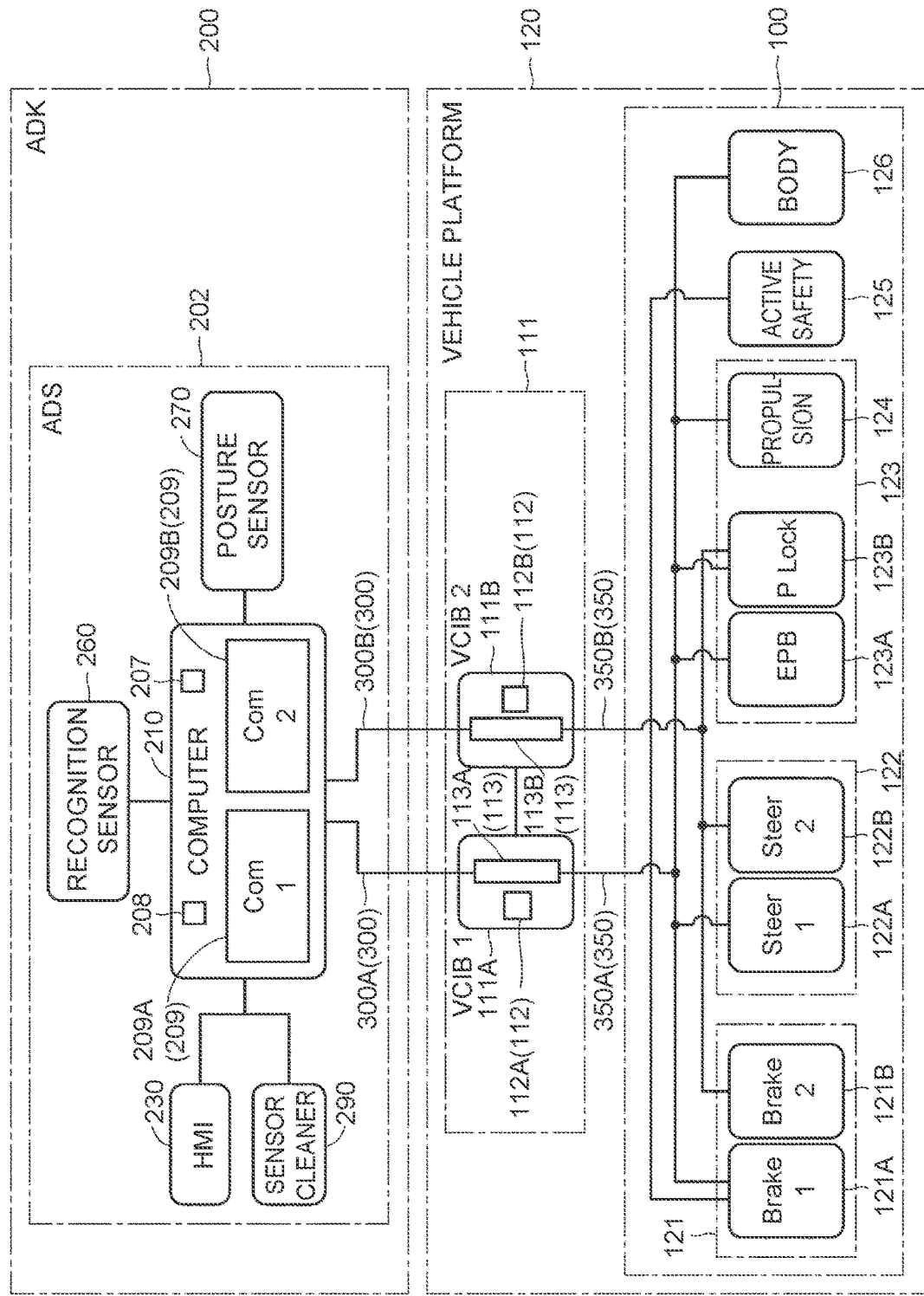
FIG. 2 is a diagram showing the configurations of an ADK (ADS) and a VP shown in FIG. 1 in more detail.

FIG. 2 is a diagram showing the configurations of the ADK 200 (ADS 202) and the VP 120 shown in FIG. 1 in more detail. Referring to FIG. 2, the ADS 202 of the ADK 200 includes a computer 210, a human-machine interface (HMI) 230, a recognition sensor 260, a posture sensor 270, and a sensor cleaner 290.

The computer 210 includes communication modules 209A, 209B, a memory 208, and a processor 207.

The communication modules 209A, 209B are configured to be able to communicate with the VCIB 111. Hereinafter, the communication modules 209A, 209B may be collectively referred to as a "communication module 209." The communication module 209 communicates with the VCIB 111 by CAN communication.

The memory 208 includes, in its configuration, a read-only memory (ROM) and a random-access memory (RAM). The ROM stores data and programs used for processes executed by the processor 207. The RAM functions as a working memory. Specific examples of the data stored in the memory 208 will be described later.

The computer 210 acquires the environment around the vehicle as well as the posture, the behavior, and the position of the vehicle 10 using various sensors (to be described later) during autonomous driving of the vehicle 10, and acquires the vehicle state from the VP 120 via the VCIB 111, and then sets the next action of the vehicle 10 (acceleration, deceleration, turning, etc.). The computer 210 outputs various control requests for realizing the set next action to the VCIB 111 of the VP 120.

The HMI 230 presents information to the user and receives the user's operation during autonomous driving, during driving that requires the user's operation, and during transition between autonomous driving and driving requiring the user's operation. For example, the HMI 230 is configured to be connectable to an input-output device (not shown), such as a touch panel display, provided in the VP 120.

The recognition sensor 260 is a sensor for recognizing the environment around the vehicle. For example, the recognition sensor 260 includes, in its configuration, at least one of a laser imaging detection and ranging (LIDAR), a millimeter-wave radar, and a camera.

The LIDAR is a distance measuring device that emits a laser beam (infrared ray) in pulses and measures a distance based on the time taken for the laser beam to return by reflecting off a target. The millimeter-wave radar is a distance measuring device that measures a distance and a direction of a target by emitting radio waves of short wavelength to the target and detecting radio waves returning from the target. The camera is disposed, for example, on a rear side of a rearview mirror inside a vehicle cabin and used to take images on the front side of the vehicle 10. Image processing using artificial intelligence (AI) or an image processing processor is performed on images and videos taken by the camera to allow recognition of other vehicles, obstacles, persons, etc. present on the front side of the vehicle 10. Information acquired by the recognition sensor 260 is output to the computer 210.

The posture sensor 270 is a sensor for detecting the posture, the behavior, and the position of the vehicle 10. The posture sensor 270 includes, in its configuration, for example, an inertial measurement unit (IMU) and a global positioning system (GPS).

For example, the IMU detects an acceleration rate of the vehicle 10 in a front-rear direction, a left-right direction, and an up-down direction, and an angular speed of the vehicle 10 in a rolling direction, a pitch direction, and a yaw direction. The GPS detects the position of the vehicle 10 using information received from a plurality of GPS satellites circling in orbit around the Earth. Information acquired by the posture sensor 270 is output to the computer 210.

The sensor cleaner 290 is configured to remove contaminants adhering to the various sensors. For example, the sensor cleaner 290 removes contaminants adhering to a lens of the camera, an irradiation unit of laser or radio waves, etc. using a cleaning fluid, a wiper, etc.

The VCIB 111 includes a VCIB 111A and a VCIB 111B. The VCIB 111A includes an ECU 112A and a communication device 113A. The VCIB 111B includes an ECU 112B and a communication device 113B. Each of the ECUs 112A, 112B includes, in its configuration, a processor (not shown), such as a central processing unit (CPU), and memories (a ROM and a RAM; not shown). The ROM stores programs that can be executed by the processor. The processor executes various processes in accordance with programs stored in the ROM. The RAM functions as a working memory. The ECUs 112A, 112B are processing devices that control the VCIBs 111A, 111B, respectively. The communication devices 113A, 113B are configured to communicate with the ADS 202 and the base vehicle 100. The communication devices 113A, 113B operate according to orders from the ECUs 112A, 112B, respectively.

The VCIB 111A is mutually communicably connected to the communication module 209A of the ADS 202 through the communication device 113A and a CAN communication line (CAN bus) 300A. The CAN communication line 300A connects the VCIB 111A and the ADS 202 to each other. The VCIB 111A is mutually communicably connected to the base vehicle 100 through the communication device 113A and a CAN communication line 350A. The CAN communication line 350A connects the VCIB 111A and the base vehicle 100 to each other.

The VCIB 111B is mutually communicably connected to the communication module 209B of the ADS 202 through the communication device 113B and a CAN communication line 300B. The CAN communication line 300B connects the VCIB 111B and the ADS 202 to each other. The VCIB 111B is mutually communicably connected to the base vehicle 100 through the communication device 113B and a CAN communication line 350B. The CAN communication line 350B connects the VCIB 111B and the base vehicle 100 to each other.

Hereinafter, the ECUs 112A, 112B may be collectively referred to as an "ECU 112," and the communication devices 113A, 113B may be collectively referred to as a "communication device 113." The CAN communication lines 300A, 300B may be collectively referred to as a "CAN communication line 300," and the CAN communication lines 350A, 350B may be collectively referred to as a "CAN communication line 350."

Signals transmitted through the CAN communication line 300 and the CAN communication line 350 may also be referred to as "CAN signals." The CAN signals correspond to the control requests or control instructions and are mainly used to control the base vehicle 100 or transmit a signal showing the state of the base vehicle 100. The VCIB 111 acts as an interface between the base vehicle 100 and the ADS 202 by CAN communication using the CAN signals.

The VCIB 111A and the VCIB 111B are also mutually communicably connected to each other. Compared with the VCIB 111A, the VCIB 111B has equivalent functions but is connected to partially different systems constituting parts of the VP 120.

Each of the VCIBs 111A, 111B relays a control request and a vehicle state between the ADS 202 and the VP 120. This will be more specifically described using the VCIB 111A as a representative. The VCIB 111A receives various control requests output from the ADS 202 according to an API defined for each control request. Then, the VCIB 111A generates an instruction corresponding to the received control request and outputs the instruction to a system (including the ECU of the system) of the base vehicle 100 that corresponds to the control request. In this embodiment, the control requests that the VCIB 111 receives from the ADS 202 include a drive control request, a steering control request, and a power source state control request for the base vehicle 100.

The VCIB 111A receives vehicle information output from each system of the VP 120 through the CAN communication line 350A and transmits information showing the vehicle state of the VP 120 to the ADS 202 according to an API defined for each vehicle state. The information showing the vehicle state that is transmitted to the ADS 202 may be the same information as the vehicle information that is output from each system of the VP 120, or may be information extracted from the vehicle information as information used for a process to be executed in the ADS 202. In this embodiment, the vehicle state transmitted to the ADS 202 includes a result of responding to a control request from the ADS 202.

As the VCIB 111A and the VCIB 111B having equivalent functions in relation to the operation of some systems (e.g., braking and steering) are provided, there are redundant control systems between the ADS 202 and the VP 120. Therefore, when some trouble occurs in a part of a system, the functions (turning, stopping, etc.) of the VP 120 can be maintained by, as necessary, switching the control system or shutting down a control system in which the trouble has occurred.

The brake system 121 includes brake systems 121A, 121B. The steering system 122 includes steering systems 122A, 122B. The powertrain system 123 includes an EPB system 123A, a P-Lock system 123B, and a propulsion system 124.

The VCIB 111A and the brake system 121A, the steering system 122A, the EPB system 123A, the P-Lock system 123B, the propulsion system 124, and the body system 126 are mutually communicably connected to each other through the CAN communication line 350A. The VCIB 111B and the brake system 121B, the steering system 122B, and the P-Lock system 123B are mutually communicably connected to each other through the CAN communication line 350B.

Each of the brake systems 121A, 121B is configured to be able to control the braking devices provided in the respective wheels. The brake system 121B may have functions equivalent to those of the brake system 121A. Or one of the brake systems 121A, 121B may be configured to be able to independently control the braking force of each wheel during travel of the vehicle, and the other one may be configured to be able to control the wheels such that the same braking force is generated in each wheel during travel of the vehicle.

Each of the brake systems 121A, 121B generates a braking instruction for the braking device according to a control request received from the ADS 202 through the VCIB 111. For example, the brake systems 121A, 121B control the braking device using a braking instruction generated by one of the brake systems and, when an abnormality occurs in that brake system, control the braking device using a braking instruction generated by the other brake system.

Each of the steering systems 122A, 122B is configured to be able to control the steering angle of the steering wheel of the vehicle 10 using the steering device. Compared with the steering system 122A, the steering system 122B has similar functions.

Each of the steering systems 122A, 122B generates a steering instruction for the steering device according to a control request received from the ADS 202 through the VCIB 111. For example, the steering systems 122A, 122B control the steering device using a steering instruction generated by one of the steering systems and, when an abnormality occurs in that steering system, control the steering device using a steering instruction generated by the other steering system.

The EPB system 123A is configured to be able to control the EPB. The EPB is provided separately from the braking device and fixes the wheels by operation of an actuator. For example, the EPB fixes the wheels by activating a drum brake for parking brake provided in some of the wheels by means of the actuator, or fixes the wheels by activating a braking device by means of an actuator that can adjust an oil pressure supplied to the braking device separately from the brake systems 121A, 121B.

The EPB system 123A controls the EPB according to a control instruction received from the ADS 202 through the VCIB 111.

The P-Lock system 123B is configured to be able to control a P-Lock device. The P-Lock device engages a protrusion provided at a leading end of a parking lock pawl, of which the position is adjusted by an actuator, with teeth of a gear (lock gear) that is provided so as to be coupled to a rotating element inside the transmission of the base vehicle 100. Thus, an output shaft of the transmission is fixed so as not to rotate, and the wheels are fixed.

The P-Lock system 123B controls the P-Lock device according to a control request received from the ADS 202 through the VCIB 111. The P-Lock system 123B activates the P-Lock device when the control request from the ADS 202 includes a request for moving the shift range to a parking range (P-range), and deactivates the P-Lock device when the control request includes a request for moving the shift range to other range than the P-range.

The propulsion system 124 is configured to be able to switch the shift range using a shift device and control a drive force of the vehicle 10 relative to a moving direction of the vehicle 10 using a drive source. Examples of switchable shift ranges include the P-range, a neutral range (N-range), a forward travel range (D-range), and a rearward travel range (R-range). Examples of the drive source include a motor-generator and an engine.

The propulsion system 124 controls the shift device and the drive source according to a control request received from the ADS 202 through the VCIB 111.

The active safety system 125 is communicably connected to the brake system 121A. As described above, the active safety system 125 detects obstacles etc. (obstacles and persons) on the front side of the vehicle using the camera 129A and the radar sensor 129B and, when it is determined that there is a possibility of a collision based on the distance to an obstacle etc., outputs a braking instruction to the brake system 121A so as to increase the braking force.

The body system 126 controls parts including the direction indicator, the horn, and the wiper according to a control instruction received from the ADS 202 through the VCIB 111.

In the vehicle 10 having the above-described configuration, autonomous driving is executed when an autonomous mode (autonomous driving mode) is selected as an autonomous state, for example, by the user's operation of the HMI 230. In autonomous driving, the ADS 202 first creates a travel plan as described above. Examples of travel plans include a plan in which the vehicle continues to travel straight forward, a plan in which the vehicle turns left or right at a predetermined intersection at some point on a predetermined travel route, and a plan in which the vehicle changes lanes.

The ADS 202 calculates control-related physical quantities (the acceleration rate, the deceleration rate, the tire turning angle, etc.) required for the vehicle 10 to operate in accordance with the created travel plan. The ADS 202 divides the physical quantity for each execution period of an API. Using the API, the ADS 202 outputs a control request showing the divided physical quantity to the VCIB 111. Further, the ADS 202 acquires the vehicle state (the actual moving direction of the vehicle, the state of the vehicle being fixed, etc.) from the VP 120, and re-creates a travel plan reflecting the acquired vehicle state. In this way, the ADS 202 enables autonomous driving of the vehicle 10.

FIG. 3 is a table showing data representing a plan of transmission of CAN signals (control requests) transmitted from the ADS 202 to the VCIB 111 through the CAN communication line 300.

Referring to FIG. 3, a transmission plan data 212 is stored in the memory 208 of the ADS 202. The transmission plan data 212 includes a label, signal contents, a degree of priority, a transmission cycle, a data size, and an offset.

The label is information for identifying the CAN signal. The label is associated with the signal contents, the degree of priority, the transmission cycle, the data size, and the offset. While two labels are shown in this example, the transmission plan data 212 further includes various pieces of information on CAN signals having other labels.

The signal contents show specific contents of control for which the CAN signal is used. The signal contents are drive control or wiper control of the base vehicle 100 in this example, but are not limited thereto. The transmission plan data 212 further includes various pieces of information on CAN signals having contents different from the contents of the shown two CAN signals (e.g., steering control, collision detection, power source control, air conditioner control, and other contents of control of the base vehicle 100).

The degree of priority shows whether the CAN signal is prioritized compared with other CAN signals. For example, to avoid overlapping of transmission start times of a plurality of CAN signals, the transmission start times of the respective CAN signals are set such that the transmission start time of a CAN signal having a high degree of priority (e.g., 1) precedes the transmission start time of a CAN signal having a low degree of priority (e.g., 0). The degree of priority of the CAN signal for drive control of the base vehicle 100 is higher than the degree of priority of the CAN signal for wiper control of the base vehicle 100.

The control requests for the base vehicle 100 transmitted from the ADS 202 to the VCIB 111 are classified into two groups according to the degree of priority. Specifically, the control requests are classified into a first group having a high degree of priority and a second group having a lower degree of priority than the first group. The control requests may be each classified into one of three or more groups according to the degree of priority. For example, the control requests may be classified into a group of which the degree of priority is "high," a group of which the degree of priority is "medium," and a group of which the degree of priority is "low."

The transmission cycle is a time interval between the transmission start times of one CAN signal and another CAN signal transmitted next to that one among a plurality of CAN signals having the same label. The shorter the transmission cycle of CAN signals, the higher the frequency with which CAN signals are transmitted. Conversely, the longer the transmission cycle, the lower the frequency with which CAN signals are transmitted.

The data size shows the data size of the CAN signal. A CAN signal having a larger data size takes a longer processing time in the ECU 112 when the CAN signal is received by the VCIB 111.

The offset is a shift amount (time interval) by which a transmission period of one CAN signal having one label or a transmission period of another CAN signal having another label is shifted backward in time so as to avoid overlapping of these transmission periods. The transmission period is a period from the transmission start time to the transmission end time. When the offset is determined, the transmission period of the CAN signal is determined. The ADS 202 sets the time of the offset of a control request having a relatively low degree of priority such that the transmission period of the control request having a relatively low degree of priority does not overlap with the transmission period of a control request having a relatively high degree of priority.

FIG. 4 is tables showing plans of reception of CAN signals received by the VCIB 111 and plans of transmission of CAN signals transmitted by the VCIB 111.

Referring to FIG. 4, reception plan data 432, 434 and transmission plan data 433, 435 are assumed to be stored in the memory (storage unit 430) of the VCIB 111.

The reception plan data 432 shows, by label, various pieces of information on CAN signals (control requests) that the VCIB 111 receives from the ADS 202 through the CAN communication line 300. In this example, the various pieces of information are signal contents, the degree of priority, the designed reception cycle, and the data size.

In the reception plan data 432, the label, the signal contents, the degree of priority, and the data size are the same as those shown in FIG. 3. While two labels are shown in this example, the reception plan data 432 further includes various pieces of information on CAN signals having other labels.

Information showing the designed reception cycle is shown as reception cycle information DRC1. The designed reception cycle is the reception cycle of the control request when the CAN communication line 300 is not congested. In this case, the transmission cycle (FIG. 3) of the control request matches the designed reception cycle. The reception cycle is a time interval between the reception start times of one CAN signal and another CAN signal transmitted next to that one among a plurality of CAN signals having the same label. On the other hand, when the CAN communication line 300 is congested, control requests from the ADS 202 may be pushed on the stack and the VCIB 111 may not be able to adequately execute the reception processing on the control requests. As a result, the actual reception cycle of the control request may become longer than the designed reception cycle.

The transmission plan data 433 shows, by label, various pieces of information on CAN signals (control instructions) that the VCIB 111 transmits to the base vehicle 100 through the CAN communication line 350. In this example, the various pieces of information are the signal contents, the degree of priority, the transmission cycle, the data size, and the offset. The information showing an offset is shown as offset information OIL The control instructions from the VCIB 111 to the base vehicle 100 correspond to the control requests from the ADS 202 to the VCIB 111. Thus, the transmission plan data 433 corresponds to the transmission plan data 212 (FIG. 3). For example, the degree of priority of a control instruction (as one example, the control instruction having the label B1-1) from the VCIB 111 to the base vehicle 100 corresponds to the degree of priority of the control request (as one example, the control request having the label A1-1) corresponding to that control instruction.

The reception plan data 434 shows, by label, various pieces of information on CAN signals (vehicle state signals) that the VCIB 111 receives from the base vehicle 100 through the CAN communication line 350. In this example, the various pieces of information are the signal contents, the designed reception cycle, and the data size. As one example of vehicle state signals, a signal showing the moving direction of the base vehicle 100 is shown. Information showing the designed reception cycle is shown as reception cycle information DRC2. The reception plan data 434 further includes various pieces of information about CAN signals having other labels (e.g., signals of which the signal contents show the vehicle speed or the position of the base vehicle 100 or an obstacle around the base vehicle 100).

The transmission plan data 435 shows, by label, various pieces of information on CAN signals that the VCIB 111 transmits to the ADS 202 through the CAN communication line 300. In this example, the various pieces of information are the signal contents, the transmission cycle, the data size, and the offset. Information showing the offset is shown as offset information OI2. The CAN signals transmitted from the VCIB 111 to the ADS 202 correspond to the CAN signals (vehicle state signals) that the VCIB 111 receives from the base vehicle 100. Thus, the transmission plan data 435 corresponds to the reception plan data 434.

Referring to FIG. 2 again, when CAN communication in the CAN communication lines 300, 350 becomes congested, control instructions (control requests) may fail to be appropriately transmitted from the ADS 202 to the base vehicle 100 though the VCIB 111. As a result, autonomous driving of the base vehicle 100 may not be appropriately executed according to control requests from the ADS 202.

Therefore, the VCIB 111 according to this embodiment calculates an index value showing the degree of congestion of CAN communication in the CAN communication lines 300, 350. Then, the VCIB 111 sets a transmission plan of control instructions to the base vehicle 100 according to the degrees of priority of the control instructions in CAN communication and the index value.

By this configuration, in addition to the degrees of priority of the control instructions, the degree of congestion of CAN communication is reflected on the transmission plan of the control instructions. Thus, when CAN communication is congested, the control instructions can be transmitted from the VCIB 111 to the base vehicle 100 so as to reduce the degree of congestion of CAN communication. As a result, the control instructions are appropriately transmitted from the VCIB 111 to the base vehicle 100. Therefore, autonomous driving of the base vehicle 100 can be appropriately executed according to control requests from the ADS 202.

Figure 5:
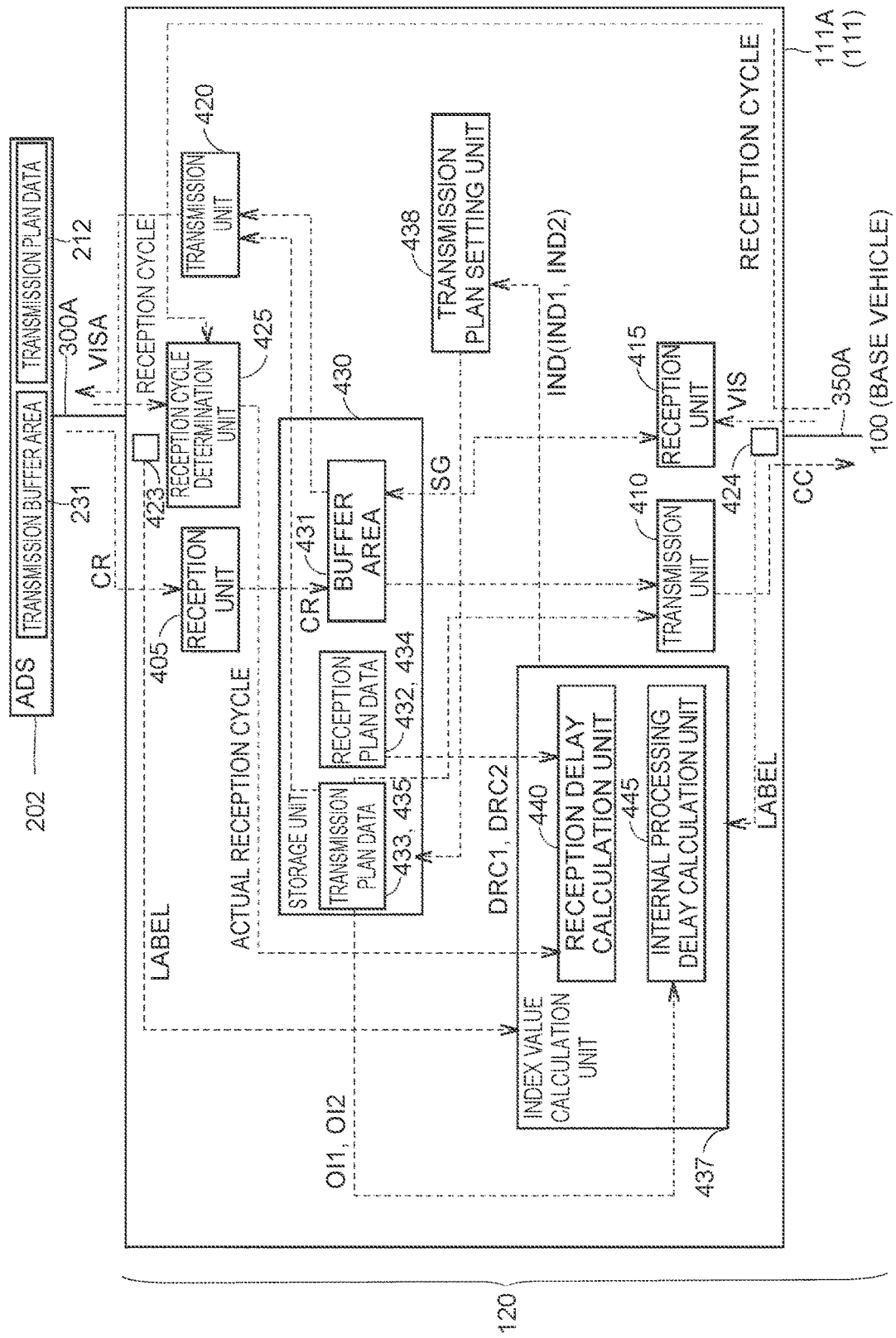
FIG. 5 is a functional block diagram of the VCIB according to the embodiment.

FIG. 5 is a functional block diagram of the VCIB 111A according to this embodiment. In this example, the functional block diagram of the VCIB 111A is shown as a representative, but the functional block diagram of the VCIB 111B is the same as the functional block diagram of the VCIB 111A except that the CAN communication lines 300A, 350A are replaced with the CAN communication lines 300B, 350B. In the following description, FIG. 4 will be referred to as necessary.

Referring to FIG. 5, the VCIB 111 includes the storage unit 430, a reception unit 405, a transmission unit 410, a reception unit 415, and a transmission unit 420.

The storage unit 430 corresponds to a memory of the VCIB 111. The functions of the reception unit 405, the transmission unit 410, the reception unit 415, and the transmission unit 420 are realized as the ECU 112 of the VCIB 111 and the communication device 113 operate in a collaborative manner. The functions of the reception units 405, 415 and the transmission units 410, 420 may be realized using an API provided by a manufacturer of the VCIB 111.

The reception unit 405 receives a control request CR for the base vehicle 100 from the ADS 202 through the CAN communication line 300A. The control request CR is transmitted from a transmission buffer area 231 (corresponding to the memory 208) of the ADS 202. When received by the reception unit 405, the control request CR is temporarily stored in a buffer area 431 of the storage unit 430 of the VCIB 111.

The transmission unit 410 transmits a control instruction CC for the base vehicle 100 corresponding to the control request CR to the base vehicle 100 through the CAN communication line 350A. The control instruction CC is generated by the transmission unit 410 based on the control request CR. For example, the control instruction CC may be the same as the control request CR or may be generated using information extracted from the control request CR for a process executed in the base vehicle 100. The transmission unit 410 acquires the control request CR from the buffer area 431 and transmits the control instruction CC to the base vehicle 100 according to the transmission plan data 433.

The reception unit 415 receives a vehicle state signal VIS from the base vehicle 100 through the CAN communication line 350A. The vehicle state signal VIS is a CAN signal showing various states of the base vehicle 100, such as the vehicle speed and the moving direction. Vehicle state signals VIS are each allotted a label according to the type (the reception plan data 434 of FIG. 4). After the reception unit 415 receives the vehicle state signal VIS, various pieces of information included in the vehicle state signal VIS are temporarily stored in the buffer area 431.

The transmission unit 420 acquires the various pieces of information included in the vehicle state signal VIS from the buffer area 431 and transmits a vehicle state signal VISA to the ADS 202. The vehicle state signal VISA corresponds to the vehicle state signal VIS and is generated by the transmission unit 420 based on the vehicle state signal VIS. For example, the vehicle state signal VISA may be the same as the vehicle state signal VIS or may be generated using information extracted from the vehicle state signal VIS for a process executed in the ADS 202. The transmission unit 420 transmits the vehicle state signal VISA to the ADS 202 through the CAN communication line 300A according to the transmission plan data 435.

The VCIB 111 further includes label extraction units 423, 424, a reception cycle determination unit 425, an index value calculation unit 437, and a transmission plan setting unit 438.

The functions of the label extraction units 423, 424 and the function of the reception cycle determination unit 425 are realized as the ECU 112 of the VCIB 111 and the communication device 113 operate in a collaborative manner. The function of the index value calculation unit 437 is realized as the ECU 112 executes a program stored in the memory of the VCIB 111.

The label extraction unit 423 extracts the label (FIG. 4) from the control request CR transmitted through the CAN communication line 300A. Similarly, the label extraction unit 424 extracts the label from the vehicle state signal VIS transmitted through the CAN communication line 350A. Each of the label extraction units 423, 424 outputs the extracted label to the index value calculation unit 437.

The reception cycle determination unit 425 determines the reception cycles of the control request CR and the vehicle state signal VIS. For example, the reception cycle determination unit 425 determines the start time and the end time of reception of the control request CR by the reception unit 405 according to a voltage level of the CAN communication line 300A. The reception cycle determination unit 425 determines, for each label (FIG. 4), the actual reception period of the control requests CR according to these start time and end time. The reception cycle determination unit 425 determines (calculates) the actual reception cycle of the control request CR based on a determination result of the reception periods of a plurality of control requests CR having the same label. The actual reception cycle of the control request CR is determined for each label of the control requests CR. The determination result is output to the index value calculation unit 437.

Similarly, the reception cycle determination unit 425 determines the start time and the end time of reception of the vehicle state signal VIS by the reception unit 415 according to a voltage level of the CAN communication line 350A and determines the reception period of the vehicle state signal VIS. The reception cycle determination unit 425 determines, for each label, the actual reception cycle of the vehicle state signal VIS based on the determination result of the reception period of the vehicle state signal VIS. This determination result is output to the index value calculation unit 437.

The index value calculation unit 437 calculates an index value IND showing the degree of congestion of CAN communication in the CAN communication lines 300A, 350A.

The index value IND includes a first communication delay time that is a delay time in communication from the ADS 202 to the base vehicle 100 through the VCIB 111. The first communication delay time includes a reception delay time of the control request CR and an internal processing delay time in the ECU 112 for the control request CR.

The index value IND also includes a second communication delay time that is a delay time in communication from the base vehicle 100 to the ADS 202 through the VCIB 111. The second communication delay time includes a reception delay time of the vehicle state signal VIS and an internal processing delay time in the ECU 112 for the vehicle state signal VIS.

In this embodiment, the delay time in communication between the ADS 202 and the base vehicle 100 is reflected on the index value IND as described above. As a result, the index value IND can be appropriately calculated.

The index value calculation unit 437 includes a reception delay calculation unit 440 and an internal processing delay calculation unit 445. The reception delay calculation unit 440 calculates a reception delay time included in each of the first communication delay time and the second communication delay time.

The index value calculation unit 437 calculates, for example, a reception delay time that occurs when the reception unit 405 receives the control request CR through the CAN communication line 300A. More specifically, for the control request CR, the reception delay calculation unit 440 calculates the reception delay time of the control request CR by subtracting the designed reception cycle from the actual reception cycle. This reception delay time may be calculated as an average value of reception delays of the control requests CR over a period having a specific length determined for each label of the control request CR. The reception delay calculation unit 440 acquires the reception cycle information DRC1 (FIG. 4) showing the designed reception cycle of the control request CR from the reception plan data 432. The reception delay calculation unit 440 receives the actual reception cycle of the control request CR from the reception cycle determination unit 425.

Similarly, the index value calculation unit 437 calculates a reception delay time that occurs when the reception unit 415 receives the vehicle state signal VIS through the CAN communication line 350A. More specifically, for the vehicle state signal VIS, the reception delay calculation unit 440 calculates the reception delay time of the vehicle state signal VIS by subtracting the designed reception cycle from the actual reception cycle. This reception delay time may be calculated as an average value of reception delays of the vehicle state signals VIS over a period having a specific length determined for each label of the vehicle state signal VIS. The reception delay calculation unit 440 acquires the reception cycle information DRC2 (FIG. 4) showing the designed reception cycle of the vehicle state signal VIS from the reception plan data 434. The reception delay calculation unit 440 receives the actual reception cycle of the vehicle state signal VIS from the reception cycle determination unit 425.

The internal processing delay calculation unit 445 calculates an internal processing delay time that is a delay time that occurs in processing inside the ECU 112 of the VCIB 111. The internal processing delay time included in the first communication delay time is a processing delay time that occurs in processing during a period from when the reception unit 405 receives the control request CR until when the transmission unit 410 transmits the control instruction CC. The internal processing delay time included in the second communication delay time is a processing delay time that occurs in processing during a period from when the reception unit 415 receives the vehicle state signal VIS until when the transmission unit 420 transmits the vehicle state signal VISA.

The internal processing delay time includes an execution time of processing by the ECU 112 and a transmission waiting time taken for a transmission waiting process aimed at communicational mediation in CAN communication. The transmission waiting time corresponds to the time of offset (FIG. 4).

The execution time of processing by the ECU 112 is determined according to the performance of the processor included in the ECU 112 and the data size (FIG. 4) of the CAN signal (specifically, the control request CR, the control instruction CC, the vehicle state signal VIS, or the vehicle state signal VISA) processed by the ECU 112. Information showing the performance of the processor is stored in the storage unit 430 beforehand.

The internal processing delay calculation unit 445 calculates (acquires) the transmission waiting time according to the transmission plan data 433, 435. Specifically, the internal processing delay calculation unit 445 calculates the transmission waiting time according to the offset information OIL 012 (FIG. 4) and the label output from the label extraction units 423, 424.

The index value calculation unit 437 calculates the index value IND according to the reception delay time of the control request CR or the vehicle state signal VIS and the internal processing delay time in the ECU 112. Specifically, the index value calculation unit 437 calculates, for each control request CR, a total of the reception delay time of the control request CR and the internal processing delay time in the ECU 112 for the control request CR as a total delay time. Similarly, the index value calculation unit 437 calculates, for each vehicle state signal VIS, a total of the reception delay time of the vehicle state signal VIS and the internal processing delay time in the ECU 112 for the vehicle state signal VIS as a total delay time.

The index value calculation unit 437 calculates an average of the total delay times calculated for the respective control requests CR as a first index value IND1 and calculates an average of the total delay times calculated for the respective vehicle state signals VIS as a second index value IND2. The first index value IND1 corresponds to the first communication delay time. The second index value IND2 corresponds to the second communication delay time. Each of the first index value IND1 and the second index value IND2 is output to the transmission plan setting unit 438.

Each of these index values IND, when equal to or larger than a threshold value, shows that communication relating to that index value IND is congested. The threshold value is determined beforehand as appropriate by prior testing.

For example, when the first index value IND1 is equal to or larger than the threshold value, communication from the ADS 202 to the base vehicle 100 through the VCIB 111 is so congested that the transmission delay of the control request CR and the control instruction CC is practically unignorable.

Similarly, when the second index value IND2 is equal to or larger than the threshold value, communication from the base vehicle 100 to the ADS 202 through the VCIB 111 is so congested that the transmission delay of the vehicle state signal VIS and the vehicle state signal VISA is practically unignorable.

On the other hand, each of the index values IND, when smaller than the threshold value, shows that communication relating to that index value IND is not congested.

For example, when the first index value IND1 is smaller than the threshold value, communication from the ADS 202 to the base vehicle 100 through the VCIB 111 is not congested. Therefore, no transmission delay of the control request CR and the control instruction CC occurs or the delay is negligibly small from a practical perspective.

Similarly, when the second index value IND2 is smaller than the threshold value, communication from the base vehicle 100 to the ADS 202 through the VCIB 111 is not congested. Therefore, no transmission delay of the vehicle state signal VIS and the vehicle state signal VISA occur or the delay is negligibly small from a practical perspective.

The transmission plan setting unit 438 sets a transmission plan of control instructions CC (the transmission plan data 433 of FIG. 4) according to the degrees of priority of the control instructions CC in CAN communication and the index value IND. In the following, before a detailed description of a process of setting the transmission plan of control instructions CC in this embodiment, a comparative example in which this transmission plan is not set will be described.

Figure 6:
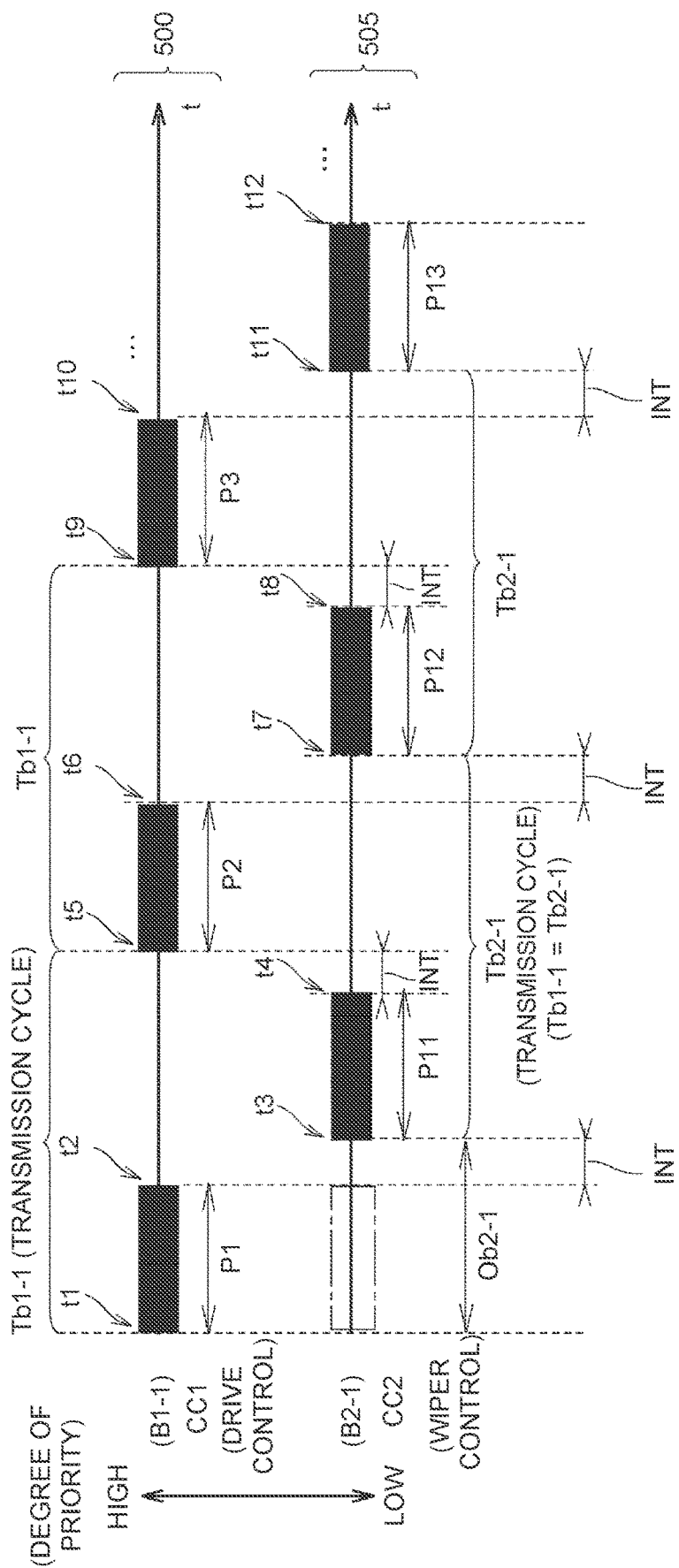
FIG. 6 is a chart illustrating timings of transmission of control instructions from the VCIB to a base vehicle in a comparative example.

FIG. 6 is a chart illustrating timings of transmission of control instructions CC from the VCIB to the base vehicle 100 in the comparative example.

Referring to FIG. 6, the timing chart 500 shows timings of transmission of a control instruction CC having a relatively high degree of priority (in other words, a control instruction CC classified into the first group). In this example, as one example of such a control instruction CC, a control instruction CC1 for drive control of the base vehicle 100 is shown.

The timing chart 505 shows timings of transmission of a control instruction CC having a relatively low degree of priority (in other words, a control instruction CC classified into the second group). In this example, as one example of such a control instruction CC, a control instruction CC2 for wiper control of the base vehicle 100 is shown.

In this example, it is assumed that both the control instructions CC1, CC2 are stored in the buffer area 431 of the VCIB immediately before time t1.

The VCIB of the comparative example sets the transmission timings (more specifically, the transmission cycles and the offsets) of the control instructions CC1, CC2 regardless of the index value IND. This will be described in detail below.

At time t1, transmission of the control instruction CC1 is started with priority. That is, since the degree of priority of the control instruction CC1 is higher than the degree of priority of the control instruction CC2, the control instruction CC1 is output from the buffer area 431 to the base vehicle 100 through the transmission unit 410 with priority over the control instruction CC2. Meanwhile, the control instruction CC2 is not output during a period P1 from time t1 to time t2 (the period indicated by the long dashed short dashed line), and is thus offset. In the comparative example, the amount of offset is Ob2-1 (FIG. 4).

The VCIB starts to transmit the control instruction CC1 at time t1 and then ends the transmission at time t2. Subsequently, transmission of the control instruction CC1 is repeated in the transmission cycle of Tb1-1 (FIG. 4) (e.g., a period P2 from time t5 to time t6 and a period P3 from time t9 to time t10).

At time t3 after time t2, the VCIB starts to transmit the control instruction CC2. Thereafter, the VCIB executes transmission of the control instruction CC2 during a period P11 from time t3 to time t4. Subsequently, transmission of the control instruction CC2 is repeated in the transmission cycle of Tb2-1 (in this example, equal to Tb1-1) of FIG. 4 (e.g., a period P12 from time t7 to time t8 and a period P13 from time t11 to time t12).

In this comparative example, a time interval INT from the end to the start of transmission of the CAN signals (the control instructions CC1, CC2) by the VCIB is related to a time interval from the end to the start of reception of the CAN signals by a reception interface (not shown) of the base vehicle 100. Therefore, when CAN signals are so incessantly output from the VCIB (the time interval INT is so short) that this reception interface cannot adequately execute the reception processing of the CAN signals, a reception delay of the control instructions CC1, CC2 may occur in the reception interface. As a result, a control instruction having a high degree of priority, such as the control instruction CC1, may fail to be appropriately transmitted to the base vehicle 100. Thus, relatively important vehicle control in autonomous driving, such as drive control of the base vehicle 100, may be delayed.

Figure 7:
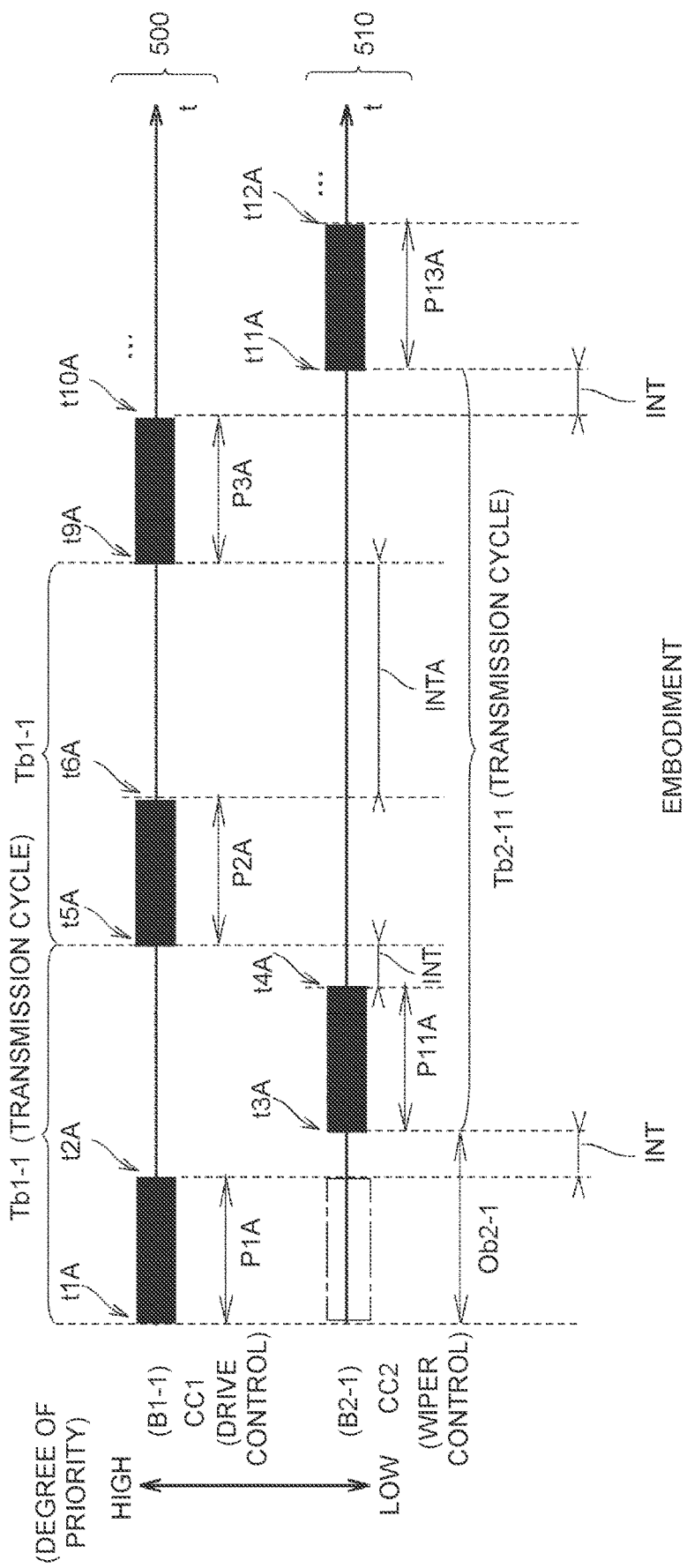
FIG. 7 is a chart illustrating one example of timings of transmission of control instructions from the VCIB to the base vehicle according to the embodiment.

FIG. 7 is a chart illustrating one example of timings of transmission of control instructions CC from the VCIB 111 to the base vehicle 100 according to the embodiment.

Referring to FIG. 7, time t1 A to time t6A correspond to time t1 to time t6 (FIG. 6), respectively. Time t9A to time t12A correspond to time t9 to time t12, respectively. Periods P1A, P2A, P3A, P11A, P13A correspond to the periods P1, P2, P3, P11, P13, respectively.

The timing chart 500 is the same as that of FIG. 6. The timing chart 510 is the same as the timing chart 505 (FIG. 6) in that it shows transmission timings of the control instruction CC2. On the other hand, the timing chart 510 is different from the timing chart 505 in that the transmission cycle of the control instruction CC2 is set (changed) to Tb2-11 (≠Tb2-1).

The VCIB 111 (in the example of FIG. 5, the transmission plan setting unit 438) sets the transmission plan (transmission timings) of the control instructions CC1, CC2 according to the index value IND and the degrees of priority of the control instructions CC1, CC2. In this example, it is assumed that both the control instructions CC1, CC2 are stored in the buffer area 431 of the VCIB 111 immediately before time t1 A. Further, it is assumed that the index value IND has exceeded the threshold value immediately before time t1A. It is assumed that the transmission cycle of the control instruction CC2 before the index value IND exceeds the threshold value is Tb2-1 (FIG. 4, FIG. 6).

As in the comparative example, the control instruction CC1 is output from the buffer area 431 to the base vehicle 100 through the transmission unit 410 with priority during the period P1A, while the control instruction CC2 is offset. Then, the control instruction CC2 is output from the buffer area 431 to the base vehicle 100 through the transmission unit 410 during the period P11A.

In this embodiment, since the index value IND is equal to or larger than the threshold value after time t1 A, the VCIB 111 changes the transmission cycle of the control instruction CC2 from Tb2-1 to Tb2-11 (>Tb2-1). More specifically, the VCIB 111 rewrites the transmission plan data 433 (FIG. 4) such that the transmission cycle of the control instruction CC1 is maintained at Tb1-1 and that the transmission cycle of the control instruction CC2 is changed from Tb2-1 to Tb2-11 (>Tb2-1). Therefore, after the period P11 A, the control instruction CC2 is not transmitted from the VCIB 111 until time t11A (period P13A) comes.

Thus, no CAN signals are transmitted throughout a time interval INTA (>INT) from the end of transmission of the control instruction CC1 at time t6A to the start of transmission of the next control instruction CC1. Therefore, a situation can be avoided where CAN signals are incessantly output from the VCIB 111 to the reception interface of the base vehicle 100 through the CAN communication line 350. As a result, a situation can be avoided where the reception interface cannot adequately execute the reception processing of the CAN signals. Thus, a reception delay of the control instruction CC1 in the reception interface can be avoided.

From another perspective, extending the transmission cycle of the control instruction CC2 results in a decrease in the transmission frequency of the control instruction CC2. Accordingly, congestion of communication from the VCIB 111 to the base vehicle 100 through the CAN communication line 350 is reduced.

As has been described above, the VCIB 111 sets the transmission plan of control instructions CC such that the transmission cycle of a control instruction classified into the second group (the group having a relatively low degree of priority) becomes longer when the index value IND is large than when the index value IND is small. This configuration makes it possible to continue the transmission of the control instruction CC1 having a high degree of priority as before CAN communication becomes congested, while temporarily postponing the transmission of the control instruction CC2 having a low degree of priority. As a result, a situation can be avoided where important vehicle control in autonomous driving, such as drive control of the base vehicle 100, is delayed.

Figure 8:
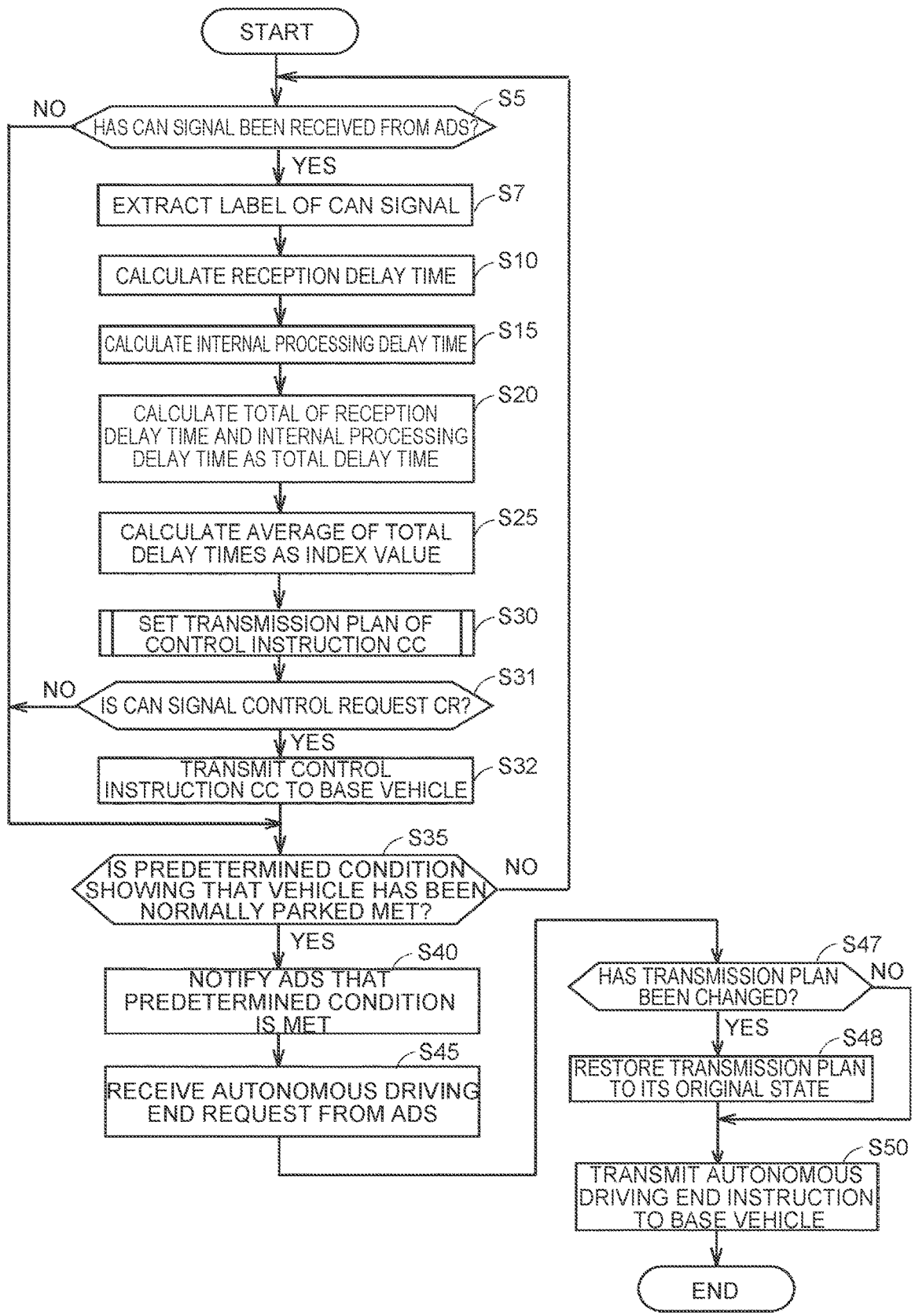
FIG. 8 is a flowchart showing one example of processes executed by the VCIB.

FIG. 8 is a flowchart showing one example of processes executed by the VCIB 111. The process of this flowchart is started when the mode of the vehicle 10 (base vehicle 100) is switched from the manual mode to the autonomous driving mode by the user's operation using the HMI 230.

Referring to FIG. 8, the VCIB 111 determines whether a CAN signal has been received from the ADS 202 or the base vehicle 100 (step S5). Specifically, the VCIB 111 determines whether a control request CR from the ADS 202 or a vehicle state signal VIS from the base vehicle 100 has been received.

When a CAN signal has not been received (NO in step S5), the VCIB 111 moves the process to step S35. On the other hand, when a CAN signal has been received (YES in step S5), the VCIB 111 moves the process to step S7. When a plurality of CAN signals has been received in step S5, the VCIB 111 executes the processes of step S7 to step S20 for each of the received CAN signals.

Next, the VCIB 111 extracts the label (FIG. 4) of the received CAN signal (step S7). Specifically, the VCIB 111 extracts the label of the control request CR or extracts the label of the vehicle state signal VIS.

Next, the VCIB 111 calculates the reception delay time of the CAN signal (the control request CR or the vehicle state signal VIS) by subtracting the designed reception cycle of the CAN signal from the actual reception cycle thereof (step S10). Specifically, the VCIB 111 acquires the designed reception cycle of the CAN signal using the extracted label and the reception plan data 432, 434. For example, the VCIB 111 calculates the reception delay time of the control request CR by subtracting the designed reception cycle of the control request CR from the actual reception cycle thereof. Or the VCIB 111 calculates the reception delay time of the vehicle state signal VIS by subtracting the designed reception cycle of the vehicle state signal VIS from the actual reception cycle thereof.

Next, the VCIB 111 calculates the internal processing delay time in the ECU 112 for the CAN signal (step S15). Specifically, using the extracted label, the VCIB 111 acquires the data size of the CAN signal according to the transmission plan data 433, 435. The VCIB 111 calculates the execution time of processing by the ECU 112 for the CAN signal according to the acquired data size. Further, using the extracted label, the VCIB 111 calculates the transmission waiting time of the CAN signal. Then, the VCIB 111 calculates a total of the execution time of processing by the ECU 112 and the transmission waiting time as the internal processing delay time.

Next, the VCIB 111 calculates a total of the reception delay time and the internal processing delay time as a total delay time (step S20). For example, the VCIB 111 calculates the total delay time for each control request CR or calculates the total delay time for each vehicle state signal VIS.

Next, the VCIB 111 calculates an average of the total delay times as the index value IND (step S25). For example, the VCIB 111 calculates an average of the total delay times for a plurality of control requests CR as the first index value IND1 or calculates an average of total delay times for a plurality of vehicle state signals VIS as the second index value IND2.

Next, the VCIB 111 sets a transmission plan of the control instruction CC (more specifically, the transmission plan data 433 of FIG. 4) according to the degree of priority of the control instruction CC in CAN communication and the index value IND (step S30).

Figure 9:
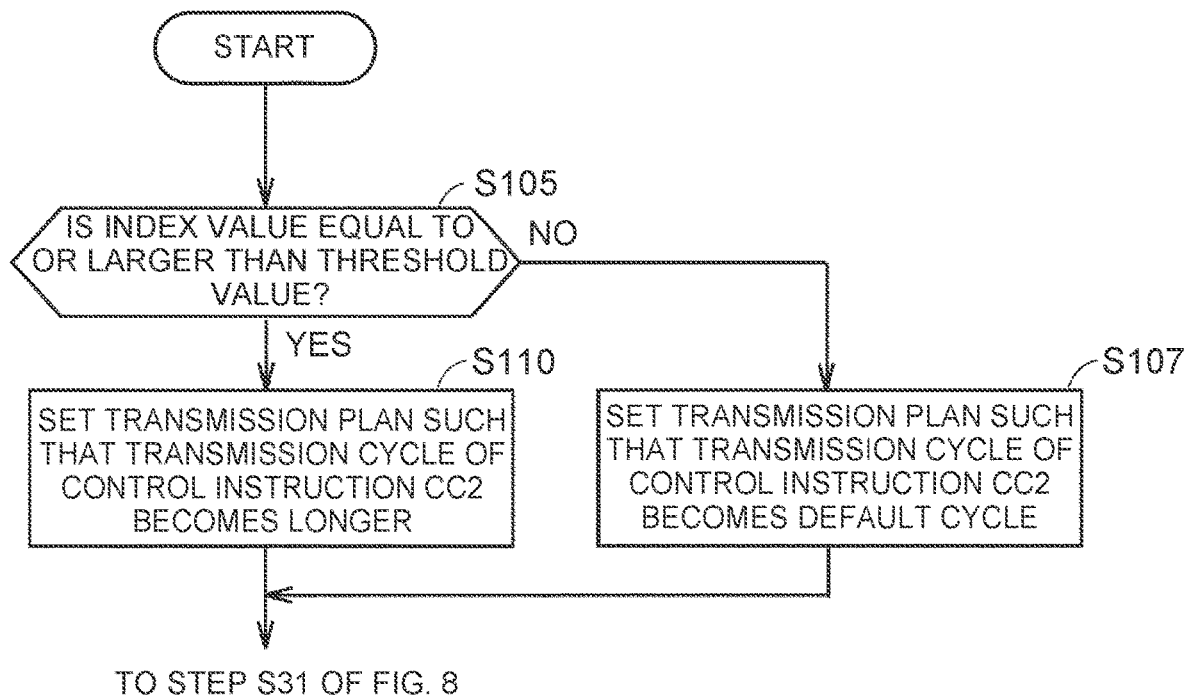
FIG. 9 is a flowchart showing details of a process of setting a transmission plan of a control instruction (step S30 of FIG. 8) in the embodiment.

FIG. 9 is a flowchart showing details of the process of setting the transmission plan of the control instruction CC (step S30 of FIG. 8) in this embodiment.

Referring to FIG. 9, the VCIB 111 determines whether the index value IND is equal to or larger than the threshold value (step S105). That the index value IND is equal to or larger than the threshold value may be either that both the first index value IND1 and the second index value IND2 are equal to or larger than the threshold value or that one of these index values is larger than the threshold value.

When the index value IND is smaller than the threshold value (NO in step S105), the VCIB 111 sets a transmission plan such that the transmission cycle of the control instruction CC2 becomes a default cycle (step S107). The default cycle is, for example, Tb2-1 (FIG. 4, FIG. 6). After step S107, the VCIB 111 moves the process to step S31 (FIG. 8).

On the other hand, when the index value IND is equal to or larger than the threshold value (YES in step S105), the VCIB 111 sets the transmission plan of the control instruction CC2 such that the transmission cycle of the control instruction CC2 becomes longer than when the index value IND is smaller than the threshold value (step S110). In the example of FIG. 7, the VCIB 111 rewrites the transmission plan data 433 (FIG. 4) such that the transmission cycle of the control instruction CC2 is changed from Tb2-1 to Tb2-11. Thereafter, the VCIB 111 moves the process to step S31 (FIG. 8).

The offset (transmission waiting time) in the transmission plan of the control instruction CC2 is, for example, Ob2-1 (FIG. 4, FIG. 6, FIG. 7).

Referring to FIG. 8 again, the VCIB 111 determines whether the CAN signal received in step S5 is a control request CR (step S31). Specifically, the VCIB 111 executes this determination process according to the label extracted in step S7 (the reception plan data 432, 434 of FIG. 4).

When the CAN signal is not a control request CR, i.e., when the CAN signal is a vehicle state signal VIS (NO in step S31), the VCIB 111 moves the process to step S35. On the other hand, when the CAN signal is a control request CR (YES in step S31), the VCIB 111 moves the process to step S32.

Next, the VCIB 111 transmits the control instruction CC to the base vehicle 100 according to the transmission plan set in step S30 (step S32). Specifically, the VCIB 111 transmits the control instruction CC to the base vehicle 100 according to the transmission cycle set in the transmission plan data 433 and the transmission timings determined by the offset.

Next, the VCIB 111 determines whether a predetermined condition showing that the base vehicle 100 has stopped normally is met (step S35). This predetermined condition is, for example, that the base vehicle 100 is parked in an area inside demarcation lines in a parking lot. Whether the base vehicle 100 has been parked in this area is determined by a commonly known image processing technique using an image taken by the camera of the active safety system 125 of the base vehicle 100. The VCIB 111 executes the determination process of step S35 according to the vehicle state signal VIS including information on this image.

When the predetermined condition is not met (NO in step S35), the base vehicle 100 is still traveling on the road in the autonomous driving mode. In this case, the VCIB 111 returns the process to step S5. On the other hand, when the predetermined condition is met (YES in step S35), the VCIB 111 notifies the ADS 202 that the predetermined condition is met by means of a vehicle state signal VISA (step S40). In response to this notification, the ADS 202 transmits an autonomous driving end request for the base vehicle 100 as a control request CR to the VCIB 111 through the communication module 209 (FIG. 2).

Next, the VCIB 111 receives, from the ADS 202, the autonomous driving end request for the base vehicle 100 as a control request CR (step S45.)

Next, the VCIB 111 divides the process according to whether the transmission plan has been changed in step S30 (step S47). Specifically, the VCIB 111 divides the process according to whether the transmission plan data 433 has been rewritten (whether the process of step S110 of FIG. 9 has been executed).

When the transmission plan has not been changed (NO in step S47), the VCIB 111 moves the process to step S50. On the other hand, when the transmission plan has been changed (YES in step S47), the VCIB 111 restores the transmission plan to its original state (step S48). Specifically, the VCIB 111 restores the transmission plan data 433 to the data before rewriting. After step S48, the VCIB 111 moves the process to step S50.

Next, the VCIB 111 transmits an autonomous driving end instruction to the base vehicle 100 as a control instruction CC (step S50). Thus, the mode of the vehicle 10 switches from the autonomous driving mode to the manual mode, and the process of FIG. 8 ends.

As has been described above, the VCIB 111 according to this embodiment calculates the index value IND showing the degree of congestion of CAN communication in the CAN communication lines 300, 350. Then, the VCIB 111 sets a transmission plan of control instructions CC to the base vehicle 100 according to the degrees of priority of the control instructions CC in CAN communication and the index value IND.

By this configuration, in addition to the degrees of priority of the control instructions CC, the degree of congestion of CAN communication is reflected on the transmission plan of the control instructions CC. Thus, when CAN communication is congested, the control instructions CC can be transmitted from the VCIB 111 to the base vehicle 100 so as to reduce the degree of congestion of CAN communication. As a result, the control instructions CC are appropriately transmitted from the VCIB 111 to the base vehicle 100. Therefore, autonomous driving of the base vehicle 100 can be appropriately executed according to control requests CR from the ADS 202.

Modified Example of Embodiment

The ADS 202 may set the transmission plan such that the transmission waiting time (offset) of the control instruction CC2 in CAN communication becomes longer when the index value IND is large than when the index value IND is small.

Figure 10:
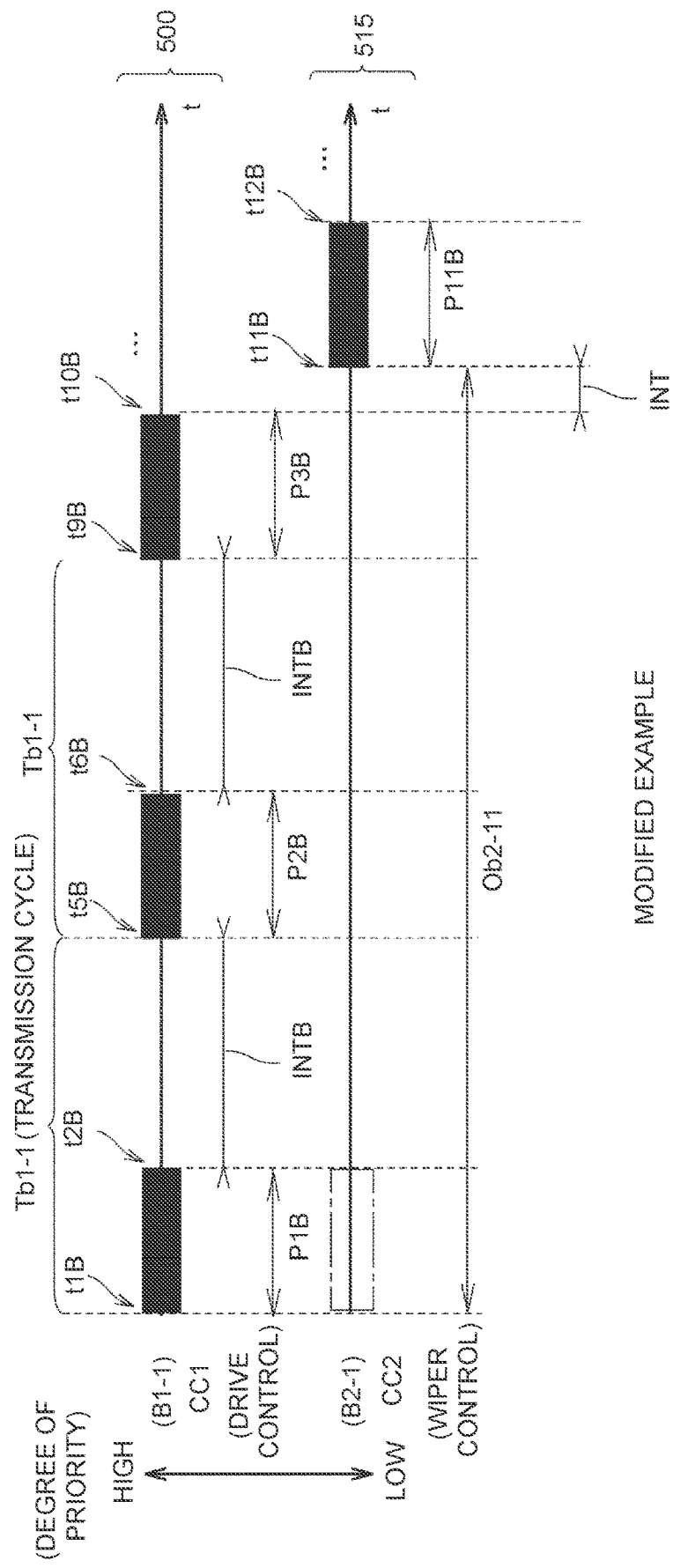
FIG. 10 is a chart illustrating one example of timings of transmission of control instructions from the VCIB to the base vehicle in a modified example.

FIG. 10 is a chart illustrating one example of timings of transmission of control instructions CC from the VCIB 111 to the base vehicle 100 in this modified example.

Referring to FIG. 10, times t1B, t2B, t5B, t6B, t9B to t12B correspond to times t1, t2, t5, t6, t9 to t12 (FIG. 6), respectively. Periods P1B, P2B, P3B, P11B correspond to the periods P1, P2, P3, P11, respectively.

The timing chart 500 is the same as that of FIG. 6. The timing chart 515 is the same as the timing chart 505 (FIG. 6) in that it shows transmission timings of the control instruction CC2. On the other hand, the timing chart 515 is different from the timing chart 505 in that the offset of the control instruction CC2 is set (changed) to Ob2-11 Ob2-1).

The VCIB 111 sets the transmission plan of the control instructions CC such that the period P11B that is a transmission period of the control instruction CC2 does not overlap with the periods P1B, P2B, P3B that are transmission periods of the control instruction CC1. In this example, it is assumed that both the control instructions CC1, CC2 are stored in the buffer area 431 of the VCIB 111 immediately before time t1B. Further, it is assumed that the index value IND has exceeded the threshold value immediately before time t1B. It is assumed that the offset of the control instruction CC2 before the index value IND exceeds the threshold value is Ob2-1 (FIG. 4, FIG. 6).

In response to the index value IND having exceeded the threshold value, the VCIB 111 changes the offset of the control instruction CC2 from Ob2-1 to Ob2-11 (>Ob2-1). More specifically, the VCIB 111 rewrites the transmission plan data 433 (FIG. 4) such that the offset of the control instruction CC2 is changed from Ob2-1 to Ob2-11.

As in the comparative example (FIG. 7), the control instruction CC1 is output from the buffer area 431 of the VCIB 111 to the base vehicle 100 with priority during the period P1B, while the control instruction CC2 is offset. In this modified example, since the offset is changed to Ob2-11, the control instruction CC2 is not output from the VCIB 111 after time t1B until time t11B (period P11B) comes.

Thus, no control instructions CC are transmitted throughout a time interval INTB (>INT) between the period P1B and the period P2B and a time interval INTB (>INT) between the period P2B and the period P3B. As a result, the degree of congestion of communication from the VCIB 111 to the base vehicle 100 through the CAN communication line 350 is reduced. Therefore, as in the case of the above-described embodiment, it is possible to continue the transmission of the control instruction CC1 having a high degree of priority as before CAN communication becomes congested, while temporarily postponing the transmission of the control instruction CC2 having a low degree of priority. (It is possible to avoid a transmission delay of the control instruction CC1.)

Figure 11:
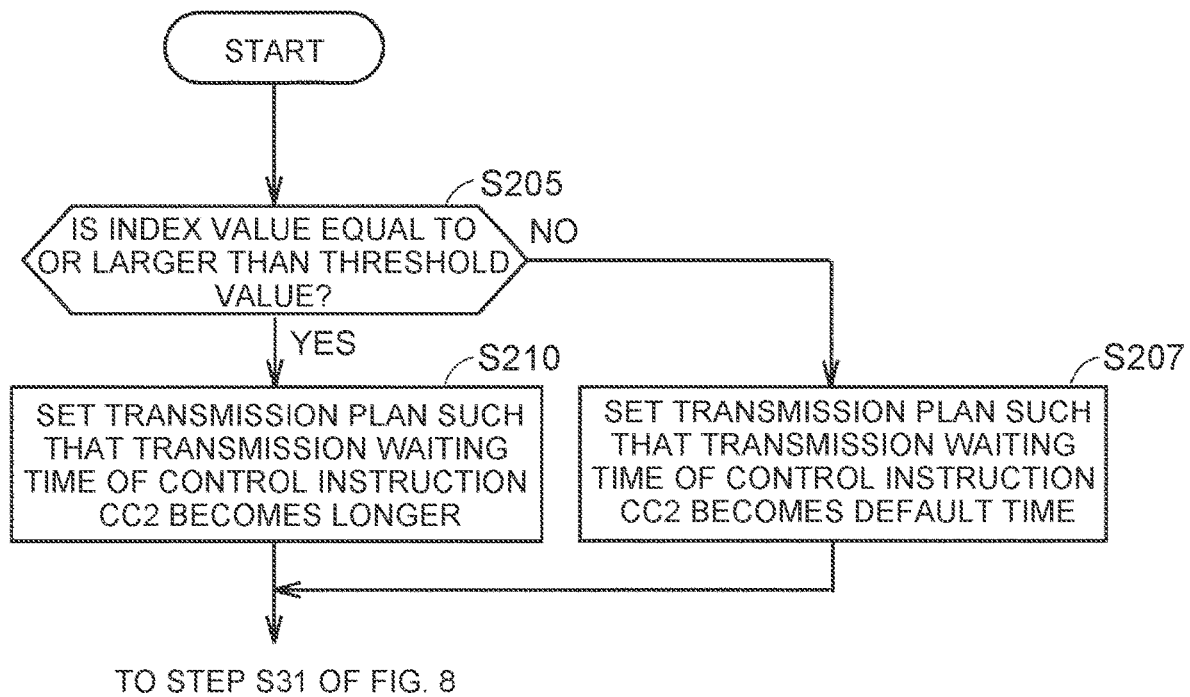
FIG. 11 is a flowchart showing details of the process of setting a transmission plan of a control instruction (step S30 of FIG. 8) in the modified example.

FIG. 11 is a flowchart showing details of the process of setting a transmission plan of the control instruction CC (step S30 of FIG. 8) in this modified example. Referring to FIG. 11, the process of step S205 is the same as the process of step S105 (FIG. 9).

When the index value IND is smaller than the threshold value (NO in step S205), the VCIB 111 sets the transmission plan such that the transmission waiting time (offset time) of the control instruction CC2 becomes a default time (step S207). The default time is, for example, Ob2-1 (FIG. 4, FIG. 6). After step S207, the VCIB 111 moves the process to step S31 (FIG. 8).

On the other hand, when the index value IND is equal to or larger than the threshold value (YES in step S205), the VCIB 111 sets the transmission plan of the control instruction CC2 such that the transmission waiting time of the control instruction CC2 becomes longer than when the index value IND is smaller than the threshold value (step S210). In the example of FIG. 10, the VCIB 111 rewrites the transmission plan data 433 (FIG. 4) such that the transmission waiting time of the control instruction CC2 is changed from Ob2-1 to Ob2-11. Thereafter, the VCIB 111 moves the process to step S31 (FIG. 8).

Other Modified Examples

CAN signals that are classified into the first group having a high degree of priority may be, other than the signal for drive control of the base vehicle 100, for example, signals used for steering control, collision detection, stop holding control, power source control, control for safety features, and control of abnormality notification of the base vehicle 100.

CAN signals that are classified into the second group having a low degree of priority may be, other than the signal for wiper control of the base vehicle 100, for example, signals used for control of interior lights, air conditioner control, and window control of the base vehicle 100.

The embodiment disclosed this time should be construed as being in every respect merely illustrative and not restrictive. The scope of the present disclosure is shown not by the above description but by the claims, and is intended to include all changes equivalent in meaning and scope to the claims.

What is claimed is:

1. A vehicle platform configured such that an autonomous driving system is installable in the vehicle platform, the vehicle platform comprising:
a vehicle; and
a vehicle control interface box configured to act as an interface between the vehicle and the autonomous driving system installed in the vehicle by controller area network communication, wherein the vehicle control interface box includes:
a first communication device configured to
receive a control request for the vehicle from the autonomous driving system,
transmit a control instruction for the vehicle generated based on the control request to the vehicle, and
set a transmission plan of the control instruction to the vehicle; and
a processor configured to calculate an index value showing a degree of congestion of the controller area network communication,
wherein the control instruction is classified into one of a plurality of groups according to a degree of priority of the control instruction in the controller area network communication,
wherein the plurality of groups includes a first group of which the degree of priority is high and a second group of which the degree of priority is lower than that of the first group, and
wherein the first communication device is configured to set the transmission plan according to the degree of priority and the index value and set the transmission plan such that a transmission cycle of the control instruction classified into the second group becomes longer when the index value is large than when the index value is small.

2. The vehicle platform according to claim 1, wherein the index value includes:
a first communication delay time that is a delay time in communication from the autonomous driving system to the vehicle through the vehicle control interface box; and
a second communication delay time that is a delay time in communication from the vehicle to the autonomous driving system through the vehicle control interface box.

3. The vehicle platform according to claim 2, wherein:
communication lines in which the controller area network communication is performed include a first communication line that connects the autonomous driving system and the vehicle control interface box to each other; and
the first communication delay time includes:
a reception delay time that occurs when the first communication device is configured to receive the control request through the first communication line; and
a processing delay time that occurs in processing during a period from when the first communication device is configured to receive the control request until when the first communication device is configured to transmit the control instruction.

4. The vehicle platform according to claim 2, wherein:
communication lines in which the controller area network communication is performed include a second communication line that connects the vehicle control interface box and the vehicle to each other;
the vehicle control interface box further includes a second communication device configured to receive a vehicle state signal showing a state of the vehicle from the vehicle;
when the second communication device is configured to receive the vehicle state signal, the second communication device is configured to transmit a signal generated based on the vehicle state signal to the autonomous driving system; and the second communication delay time includes:
- a reception delay time that occurs when the second communication device is configured to receive the vehicle state signal through the second communication line; and
- a processing delay time that occurs in processing during a period from when the second communication device is configured to receive the vehicle state signal until when the second communication device is configured to transmit a signal generated based on the vehicle state signal.

5. A vehicle platform configured such that an autonomous driving system is installable in the vehicle platform, the vehicle platform comprising:
- a vehicle; and
- a vehicle control interface box that acts as an interface between the vehicle and the autonomous driving system installed in the vehicle by controller area network communication, wherein:

the vehicle control interface box includes:
- a first communication device configured to
  - receive a control request for the vehicle from the autonomous driving system,
  - transmit a control instruction for the vehicle generated based on the control request to the vehicle, and
  - set a transmission plan of the control instruction to the vehicle; and
- a processor configured to calculate an index value showing a degree of congestion of the controller area network communication, wherein the first communication device configured to set the transmission plan according to a degree of priority of the control instruction in the controller area network communication and the index value, set a transmission waiting time of the control instruction classified into a second group such that a transmission period of the control instruction classified into the second group does not overlap with a transmission period of the control instruction classified into a first group, and set the transmission plan such that the transmission waiting time becomes longer when the index value is large than when the index value is small, wherein the control instruction is classified into one of a plurality of groups according to the degree of priority, and wherein the plurality of groups includes the first group of which the degree of priority is high and the second group of which the degree of priority is lower than that of the first group.

6. A vehicle control interface box configured to act as an interface between a vehicle platform and an autonomous driving system installed in the vehicle platform by controller area network communication, the vehicle platform including a vehicle, the vehicle control interface box comprising:
- a first communication device configured to receive a control request for the vehicle from the autonomous driving system,
  - transmit a control instruction for the vehicle generated based on the control request to the vehicle, and
  - set a transmission plan of the control instruction to the vehicle; and
- a processor configured to calculate an index value showing a degree of congestion of the controller area network communication, wherein the control instruction is classified into one of a plurality of groups according to a degree of priority of the control instruction in the controller area network communication, wherein the plurality of groups includes a first group of which the degree of priority is high and a second group of which the degree of priority is lower than that of the first group, and wherein the first communication device is configured to set the transmission plan according to the degree of priority communication and the index value and set the transmission plan such that a transmission cycle of a control instruction classified into the second group becomes longer when the index value is large than when the index value is small.

7. The vehicle control interface box according to claim 6, wherein:
- the control instruction is classified into one of a plurality of groups according to the degree of priority;
- the plurality of groups includes a first group of which the degree of priority is high and a second group of which the degree of priority is lower than that of the first group; and
- the first communication device is configured to set a transmission waiting time of the control instruction classified into the second group such that a transmission period of the control instruction classified into the second group does not overlap with a transmission period of the control instruction classified into the first group.

8. The vehicle control interface box according to claim 7, wherein the first communication device is configured to set the transmission plan such that the transmission waiting time becomes longer when the index value is large than when the index value is small.

9. The vehicle control interface box according to claim 6, wherein the index value includes:
- a first communication delay time that is a delay time in communication from the autonomous driving system to the vehicle through the vehicle control interface box; and
- a second communication delay time that is a delay time in communication from the vehicle to the autonomous driving system through the vehicle control interface box.

10. The vehicle control interface box according to claim 9, wherein:
- communication lines in which the controller area network communication is performed include a first communication line that connects the autonomous driving system and the vehicle control interface box to each other; and
- the first communication delay time includes:
  - a reception delay time that occurs when the first communication device is configured to receive the control request through the first communication line; and
  - a processing delay time that occurs in processing during a period from when the first communication device is configured to receive the control request until when the first communication device is configured to transmit the control instruction.

11. The vehicle control interface box according to claim 9, wherein:
- communication lines in which the controller area network communication is performed include a second communication line configured to connect the vehicle control interface box and the vehicle to each other;

the vehicle control interface box further comprises a second communication device configured to receive a vehicle state signal showing a state of the vehicle from the vehicle through the second communication line;

the second communication device is configured to receive the vehicle state signal, the second communication device is configured to transmit a signal generated based on the vehicle state signal to the autonomous driving system; and the second communication delay time includes:
  a reception delay time that occurs when the second communication device is configured to receive the vehicle state signal; and
  a processing delay time that occurs in processing during a period from when the second communication device is configured to receive the vehicle state signal until when the second communication device is configured to transmit a signal generated based on the vehicle state signal.

* * * * *